United States Patent
Shih et al.

(10) Patent No.: US 11,423,685 B2
(45) Date of Patent: Aug. 23, 2022

(54) DRIVING APPARATUS AND OPERATION METHOD THEREOF

(71) Applicant: Novatek Microelectronics Corp., Hsinchu (TW)

(72) Inventors: Wei-Lun Shih, Hsinchu (TW); Tsen-Wei Chang, Taichung (TW); Cho-Hsuan Jhang, Hsinchu (TW); Chih-Peng Hsia, Hsinchu County (TW); Cheng-Yu Chiang, Taoyuan (TW)

(73) Assignee: Novatek Microelectronics Corp., Hsinchu (TW)

( * ) Notice: Subject to any disclaimer, the term of this patent is extended or adjusted under 35 U.S.C. 154(b) by 43 days.

(21) Appl. No.: 16/845,001

(22) Filed: Apr. 9, 2020

(65) Prior Publication Data

US 2020/0327301 A1  Oct. 15, 2020

Related U.S. Application Data

(60) Provisional application No. 62/964,137, filed on Jan. 22, 2020, provisional application No. 62/831,718, filed on Apr. 9, 2019.

(51) Int. Cl.
*G06V 40/13* (2022.01)

(52) U.S. Cl.
CPC .................... *G06V 40/13* (2022.01)

(58) Field of Classification Search
None
See application file for complete search history.

(56) References Cited

U.S. PATENT DOCUMENTS

| | | | |
|---|---|---|---|
| 10,503,308 B2 | 12/2019 | Hung et al. | |
| 2013/0057511 A1* | 3/2013 | Shepelev | G06F 3/0412 345/174 |
| 2018/0035923 A1* | 2/2018 | Kang | A61B 5/117 |
| 2018/0164943 A1 | 6/2018 | Hung et al. | |
| 2018/0349667 A1* | 12/2018 | Kim | G06K 9/0002 |

FOREIGN PATENT DOCUMENTS

| | | |
|---|---|---|
| CN | 108614646 | 10/2018 |
| CN | 109002209 | 12/2018 |

OTHER PUBLICATIONS

"Office Action of Taiwan Counterpart Application", dated Dec. 4, 2020, p. 1-p. 18.

* cited by examiner

*Primary Examiner* — Nicholas J Lee
(74) *Attorney, Agent, or Firm* — JCIPRNET

(57) ABSTRACT

A driving apparatus and an operation method thereof are provided. The driving apparatus includes a first driving circuit and a second driving circuit. The first driving circuit performs a first driving mode on a panel. The first driving circuit performs the first driving mode during a first frame period among a plurality of frame periods and skips the first driving mode during a first skip period between the first frame period and a second frame period among the frame periods. The first driving circuit outputs timing control signal including a timing that the first driving mode is skipped. The second driving circuit is coupled to the first driving circuit to receive the timing control signal. The second driving circuit performs a fingerprint sensing operation different from the first driving mode on the panel according to the timing control signal during the first skip period.

34 Claims, 29 Drawing Sheets

+Frame

| + | I | + | I |
|---|---|---|---|
| I | + | I | + |
| + | I | + | I |
| I | + | I | + |

FIG. 17A

−Frame

| + | I | + | I |
|---|---|---|---|
| I | + | I | + |
| + | I | + | I |
| I | + | I | + |

FIG. 17B

DRIVING APPARATUS AND OPERATION METHOD THEREOF

CROSS-REFERENCE TO RELATED APPLICATION

This application claims the priority benefit of U.S. provisional application Ser. No. 62/831,718, filed on Apr. 9, 2019 and Ser. No. 62/964,137, filed on Jan. 22, 2020. The entirety of each of the above-mentioned patent applications is hereby incorporated by reference herein and made a part of this specification.

BACKGROUND

Field of the Invention

The invention relates to an electronic apparatus and more particularly, to a driving apparatus and an operating method thereof.

Description of Related Art

In order to reduce a volume of a display apparatus, a fingerprint sensing region may be overlaid on a display region of the display apparatus. For example, an under-display fingerprint sensing technique is to dispose/attach fingerprint sensors beneath (on a back surface of) a display panel, and a fingerprint image may be sensed/detected by the fingerprint sensors through the display panel. Due to the restriction in a transmittance capability of a capacitive sensor, the under-display fingerprint sensing technique adopts an optical imaging or optical sensing technique. Regarding the under-display fingerprint sensing technique, because the display panel and the fingerprint sensors are different elements, an operation of the display panel may be independent of an operation of the fingerprint sensor.

In the under-display fingerprint sensing technique, the fingerprint sensors are disposed outside the display panel. In anyway, a total thickness is still considerable after the display panel and the fingerprint sensors are overlaid with each other. Based on a design requirement for reducing a thickness of the display apparatus, an in-display fingerprint sensing technique is accordingly launched, and the in-display fingerprint sensing technique is to embed a fingerprint sensor array in the display panel, which is different from the under-display fingerprint sensing technique. Namely, the display panel capable of the in-display fingerprint sensing function has a display pixel array and an in-display fingerprint sensor array. In a scenario that the display panel is further provided with a touch sensing function, the display panel may include a display pixel array, an in-display touch sensor array and an in-display fingerprint sensor array. Because the fingerprint sensor array is embedded in the display panel, an operation of a fingerprint sensing function is usually influenced/interfered by an operation of a display function and/or the touch sensing function. For the in-display fingerprint sensing technique, how to arrange a display driving period, a touch sensing period and a fingerprint sensing period is a technical subject.

It should be noted that the contents of the section of "Description of Related Art" is used for facilitating the understanding of the invention. A part of the contents (or all of the contents) disclosed in the section of "Description of Related Art" may not pertain to the conventional technology known to the persons with ordinary skilled in the art. The contents disclosed in the section of "Description of Related Art" do not represent that the contents have been known to the persons with ordinary skilled in the art prior to the filing of this invention application.

SUMMARY

The invention provides a driving apparatus and an operation method thereof to arrange a timing relation between a first driving operation (i.e., a display driving operation and/or a touch sensing operation) and a fingerprint sensing operation.

A driving apparatus of the invention is configured to drive a panel comprising a display pixel array, a touch sensor array and a fingerprint sensor array. The driving apparatus includes a first driving circuit and a second driving circuit. The first driving circuit is configured to perform a first driving mode during a plurality of frame periods, perform a second driving mode after the plurality of frame periods, and output a first timing control signal associated with a fingerprint sensing operation, wherein the first driving mode comprises performing at least a touch sensing operation, and the first driving circuit suspends performing at least one of a display driving operation and the touch sensing operation during a skip period under the second driving mode. The second driving circuit is coupled to the first driving circuit to receive the first timing control signal. The second driving circuit is configured to perform the fingerprint sensing operation during the skip period according to the first timing control signal.

An operation method of the invention includes: performing, by a first driving circuit, a first driving mode on a panel comprising a display pixel array, a touch sensor array and a fingerprint sensor array during a plurality of frame periods; performing, by the first driving circuit, a second driving mode after the plurality of frame periods; outputting, by the first driving circuit, a first timing control signal associated with a fingerprint sensing operation, wherein the first driving mode comprises performing at least a touch sensing operation, and the first driving circuit suspends performing at least one of a display driving operation and the touch sensing operation during a skip period under the second driving mode; and performing, by a second driving circuit, the fingerprint sensing operation during the skip period according to the first timing control signal.

Based on the above, in some embodiments, the driving apparatus and the operation method thereof can drive the panel with a fingerprint sensing function. The first skip period is located between the first frame period and the second frame period among the plurality of frame periods. The first driving circuit performs the first driving operation (e.g., the display driving operation, the touch sensing operation and/or other operations) on the panel during the first frame period and skips the first driving operation during the first skip period. The second driving circuit performs the fingerprint sensing operation different from the first driving operation on the panel during the first skip period. In this way, the driving apparatus can arrange the timing relation between the first driving operation and the fingerprint sensing operation.

To make the above features and advantages of the invention more comprehensible, embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 16A and 16B are schematic timing diagrams illustrating two adjacent display frames with column inversion according to further another embodiment of the invention.

FIGS. 17A and 17B are schematic timing diagrams illustrating two adjacent display frames with dot inversion according to further another embodiment of the invention.

DESCRIPTION OF EMBODIMENTS

Figure 1:
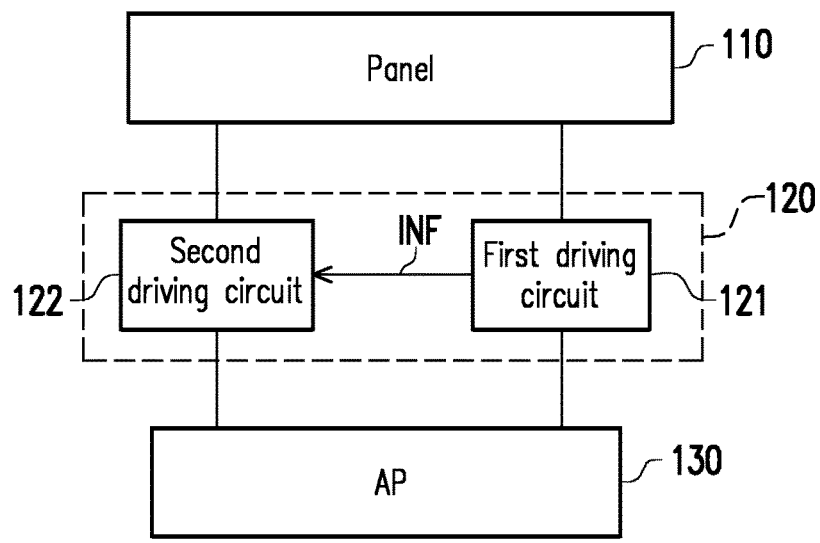
FIG. 1 is a schematic circuit block diagram illustrating a display apparatus according to an embodiment of the invention.

The term "couple (or connect)" throughout the specification (including the claims) of this application are used broadly and encompass direct and indirect connection or coupling means. For example, if the disclosure describes a first apparatus being coupled (or connected) to a second apparatus, then it should be interpreted that the first apparatus can be directly connected to the second apparatus, or the first apparatus can be indirectly connected to the second apparatus through other devices or by a certain coupling means. Terms such as "first" and "second" mentioned throughout the specification (including the claims) of this application are only for naming the names of the elements or distinguishing different embodiments or scopes and are not intended to limit the upper limit or the lower limit of the number of the elements not intended to limit sequences of the elements. Moreover, elements/components/steps with same reference numerals represent same or similar parts in the drawings and embodiments. Elements/components/notations with the same reference numerals in different embodiments may be referenced to the related description.

FIG. 1 is a schematic circuit block diagram illustrating a display apparatus 100 according to an embodiment of the invention. The display apparatus 100 illustrated in FIG. 1 includes a panel 110, a driving apparatus 120 and an application processor (AP) 130. AP is a core control processor in a handheld computer device or a mobile phone. The panel 110 may be any panel provided with a fingerprint sensing function. The panel 110 is not limited to any specific structure in the present embodiment. For example, in some embodiments, the panel 110 may be a display panel with an in-display fingerprint sensing function. Namely, the panel 110 has a display pixel array (for providing a display function) and a fingerprint sensor array (for providing the fingerprint sensing function).

In some other embodiments, the panel 110 may be a touch display panel with the in-display fingerprint sensing function. Namely, the panel 110 has a display pixel array, an in-display touch sensor array (for providing a touch sensing function) and an in-display fingerprint sensor array. A display scan driving circuit, also called display gate in panel (GIP) or display gate on array (GOA), and a fingerprint scan driving circuit, also called fingerprint GIP or fingerprint GOA, are disposed in the panel 110. The AP 130 controls the driving apparatus 120, such that the driving apparatus 120 drives the panel 110. The first driving circuit 121 may be communicated with the AP 130 via a MIPI interface for display-related information and a I2C interface for touch-related information, so that display-related data/commands/control signals are transmitted based on a MIPI protocol and touch-related data/commands/control signals are transmitted based on a I2C protocol. The second driving circuit 122 may be communicated with the AP 130 via SPI (serial-to parallel interfaces) so that fingerprint sensing-related data/commands/control signals is transmitted based on a SPI protocol. The driving apparatus 120 is coupled to the panel 110. The driving apparatus 120 may provide control clocks (such as those used for generating scan driving signals) to the display scan driving circuit and provides data voltages so as to drive the display pixel array of the panel 110 to display an image frame on the panel 110. The driving apparatus 120 may provide different voltages to generate a touch driving signal to drive the in-display touch sensor array of the panel 110 to detect a touch event of the panel 110. The driving apparatus 120 provides control clocks to the fingerprint scan driving circuit to generate fingerprint scan driving signals to drive the in-display fingerprint sensor array of the panel 110 to read/sense a fingerprint image.

In the embodiment illustrated in FIG. 1, the driving apparatus 120 includes a first driving circuit 121 and a second driving circuit 122. Based on the control of the AP 130, the first driving circuit 121 performs a display driving operation and a touch sensing operation on the panel 110. In some embodiments, the first driving circuit 121 maybe a touch with display driver integration (TDDI) circuit. Based on the control of the AP 130, the second driving circuit 122 performs a fingerprint sensing operation on the panel 110. The AP 130 receives a sensing result of the fingerprint sensing operation from the second driving circuit 122, so as to obtain the fingerprint image and be able to perform fingerprint recognition. The first driving circuit 121 and the second driving circuit 122 may be integrated within a semiconductor chip. Or, the first driving circuit 121 and the second driving circuit 122 may be two separate semiconductor chips installed in a chip-on-glass (COG) package, chip-on-film (COF) package, chip on plastic (COP) package, or chip-on-board (COB) package. The implementation details of the display driving operation, the touch sensing operation and the fingerprint sensing operation are not limited in the present embodiment. For example, based on a design requirement, the display driving operation may be a conventional display driving operation or other driving operations, the touch sensing operation may be a conventional touch sensing operation and is not limited to be self-capacitive or mutual capacitive sensing, and the fingerprint sensing operation may be a conventional fingerprint sensing operation or other sensing operations. Generally, the fingerprint sensing operation may likely be influenced/interfered by the driving operation (e.g., an operation of a display driving function and/or a touch sensing function).

Figure 2:
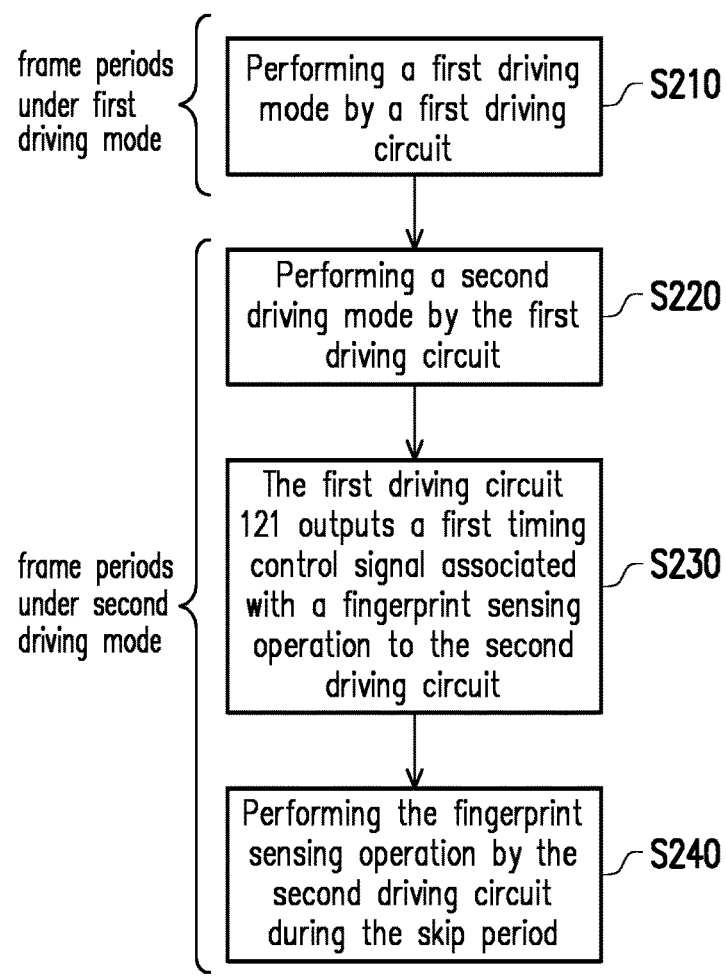
FIG. 2 is a flowchart illustrating an operation method of the driving apparatus according to an embodiment of the invention.
Figure 3:
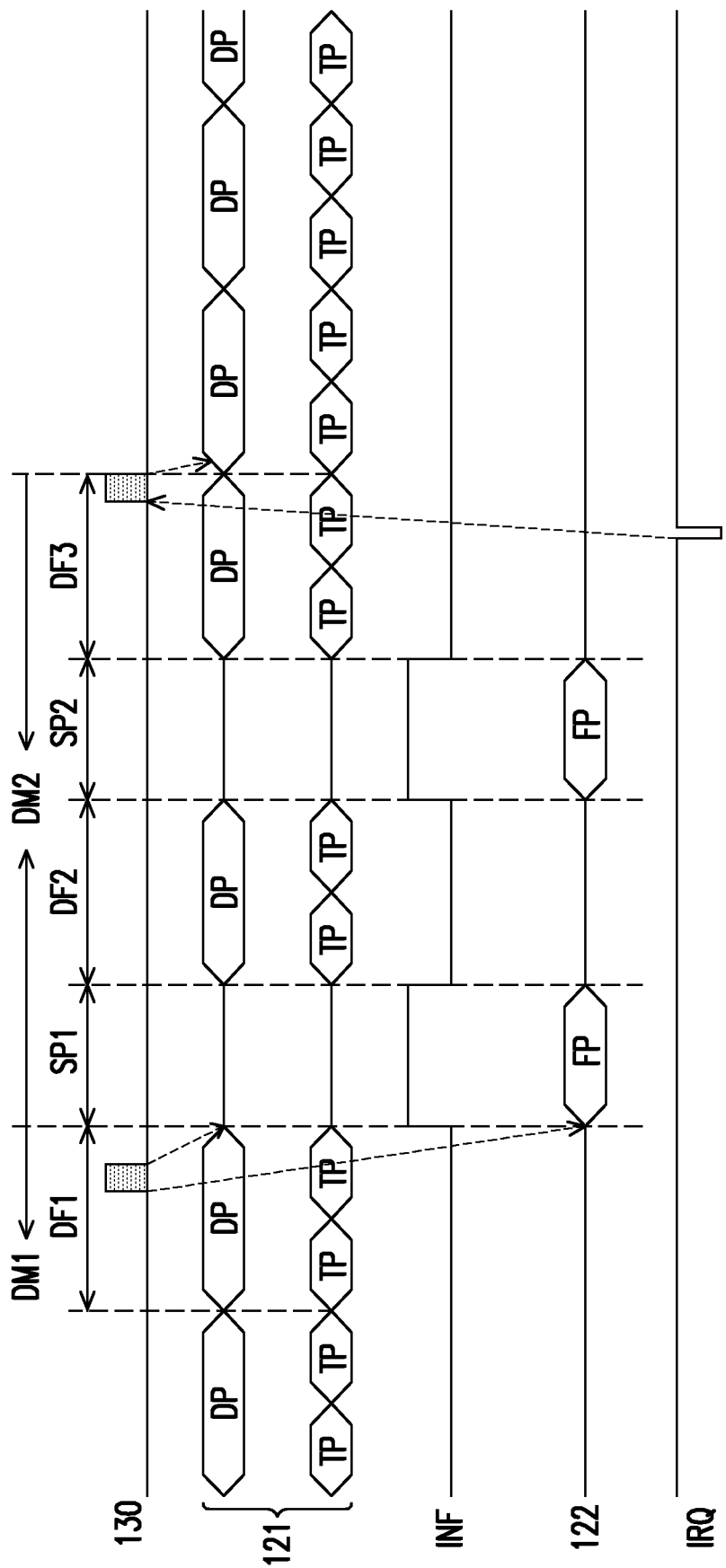
FIG. 3 is a schematic timing diagram illustrating a plurality of frame periods according to an embodiment of the invention.

FIG. 2 is a flowchart illustrating an operation method of the driving apparatus 120 according to an embodiment of the invention. FIG. 2 is introduced referring to FIG. 3, which is an exemplary schematic timing diagram illustrating a plurality of frame periods under operating the method of FIG. 2 the according to an embodiment of the invention. The lateral axis illustrated in FIG. 3 represents the time. Some of a plurality of frame periods illustrated in FIG. 3 are denoted by DF1, SP1, DF2, SP2 and DF3. In the embodiment illustrated in FIG. 3, the frame period DF1 and preceding frame periods are under a first driving mode DM1. The first driving mode DM1 may be performing both the display driving operation and the touch sensing operation (by the first driving circuit 121), such as when the panel 110 keeps refreshing the displayed content, or may be performing the touch sensing operation and also stop performing the display driving operation, such as when the panel 110 enters an idle state and stop refreshing the display content. The frame periods SP1, DF2, SP2 and DF3 are under a second driving mode DM2. The second driving mode DM2 may be suspending performing both the display driving operation and the touch sensing operation (by the first driving circuit 121), or suspending performing the display driving operation and keeping performing the touch sensing operation. The touch sensing frequency (touch frame rate) and/or the display frequency (display frame rate) in the second driving mode DM2 may be same as or lower than that in the first driving mode DM1.

In some embodiments, the second driving mode DM2 may be a frame skip mode. The first driving circuit 121 is configured to periodically perform an operating cycle in the frame skip mode (the second driving mode DM2). The operating cycle includes an active period consisting of N consecutive frame periods and a skip period consisting of M consecutive frame periods, where N or M is an integer equivalent to one or more, such as N=1 and M=1, or N=1 and M=2. During the active period, the first driving circuit 121 performs at least touch sensing operation, and during the skip period, the first driving circuit 121 suspends performing (or called skips) at least one of the display driving operation and the touch sensing operation. When entering the frame skip mode, the active period comes first then the skip period comes, or the skip period comes first then the active period comes. The length of each frame period in the active period is not limited to be same or different from the length of each frame period in the skip period. In the example shown in FIG. 2, the frame skip mode performed two cycles, M=1 and N=1, so the frame periods SP1 and DF2 are in the first operating cycle and the frame periods SP2 and DF3 are in the second operating cycle. The frame periods SP1 and SP2 are skip periods, and the frame periods DF2 and DF3 are active periods.

In other embodiments, the second driving mode DM2 may be a porch mode. The first driving circuit 121 is configured to periodically perform an operating cycle which equals a frame period in the porch mode. In the porch mode, the first driving circuit 121 is configured to suspend performing at least one of the display driving operation and the touch sensing operation during a porch interval of each of frame periods. The porch interval may be a front porch interval between the end of the last data (which may be display data or touch sensing data) of a previous frame and a frame synchronization (Vsync) of a current frame. The porch interval may be a back porch interval between the frame synchronization (Vsync) of the current frame and the start of the first data (which may be display data or touch sensing data) of the current frame. The porch interval is taken as a skip period and the length of the porch interval may be configured by a core control processor of the display apparatus 100, i.e., the AP 130. The length of the porch interval (used as the skip period) configured by the AP 130 is acceptable to the display quality of the panel 110, since the skip period too long may degrade the display quality. For example, in a condition when the least acceptable display frame rate is around 30 Hz, the porch interval may be a length from 1 ms to 33 ms. The length of the skip period may be considered based on the time length that the fingerprint sensing operation needs to get sensing results to generate a fingerprint image good enough. In a scheme that the display driving operation and touch sensing operation are performed time-divisionally, display intervals and touch sensing intervals are as an active period. More examples of the porch mode are described in FIG. 22.

The operation method of FIG. 2 is described as follows. The first driving circuit 121 performs a first driving mode (DM1) during a plurality of frame periods (step S210). After the frame periods under the first driving mode ends, the first driving circuit 121 performs the second driving mode (DM2) (step S220). The AP 130 sends a command or a control signal to wake up the second driving circuit 122 to perform the fingerprint sensing operation, and sends another command or control signal to inform the first driving circuit 121. The first driving circuit 121 performs the second driving mode (DM2) (step S220) in response to receiving the command from the AP 130, and outputs a first timing control signal (INF in FIG. 3) associated with a fingerprint sensing operation to the second driving circuit 122 (step S230). In the second driving mode (DM2), the first driving circuit 121 suspends performing at least one of a display driving operation and the touch sensing operation during a skip period under the second driving mode (DM2). The second driving circuit 122 performs the fingerprint sensing operation during the skip period according to the first timing control signal (INF) (step S240). The fingerprint sensing operation during the skip period may be at least one of a reset operation (which is to reset the fingerprint sensor array, row by row) and a readout operation (which is to read fingerprint sensing results from the fingerprint sensor array, row by row). During the fingerprint sensing operation, the second driving circuit 122 may acquire sensing results of one or more fingerprint images which are to be transmitted to the AP 130, or may additionally generate a final fingerprint image to be transmitted to the AP 130. After the fingerprint sensing operation is completed, the second driving circuit 122 may return to the idle (inactive/standby) state and send an interrupt (IRQ in FIG. 3) to the AP 130. In response to receiving the interrupt indicating the completion of the fingerprint sensing operation, the AP 130 may send another command to the first driving circuit 121, controlling the first driving circuit 121 to return to a state same as before the second driving mode DM2 starts, i.e., back to the first driving mode DM1, but it is not a limitation to the embodiments.

FIG. 3 illustrates an example that the first driving circuit 121 is operated in the first driving mode DM1 that is performing the display driving operation, denoted by "DP", and the touch sensing operation, denoted by "TP", during the frame period DF1 and preceding frame periods. The first driving circuit 121 suspends performing both of the display driving operation and the touch sensing operation during the frame periods SP1 and SP2, which are skip periods, and the second driving circuit 122 performs the fingerprint sensing operation, denoted by "FP", during the frame periods SP1 and SP2. During the active periods as the frame periods DF2 and DF3, that the first driving circuit 121 performs the display driving operation and the touch sensing operation. The first timing control signal INF is generated by the first driving 121 to indicates what time and how long at least one of the display driving operation and the touch sensing operation is suspended in the second driving mode DM2. In another aspect, the first timing control signal INF is a signal associated with the fingerprint sensing operation because the fingerprint sensing operation is performed at different time from the display driving operation or touch sensing operation due to the fingerprint sensor is embedded in the display panel. As in FIG. 3, the first timing control signal INF has a logic high level indicating that both of the display driving operation and the touch sensing operation are suspended and meanwhile, the fingerprint sensing operation is enabled or said active, denoted by "FP". The first timing control signal INF has a logic low level indicating that both of the display driving operation and the touch sensing operation are active, denoted by "DP" and "TP", and meanwhile, the fingerprint sensing operation is disabled (inactive or standby).

Figure 4A:
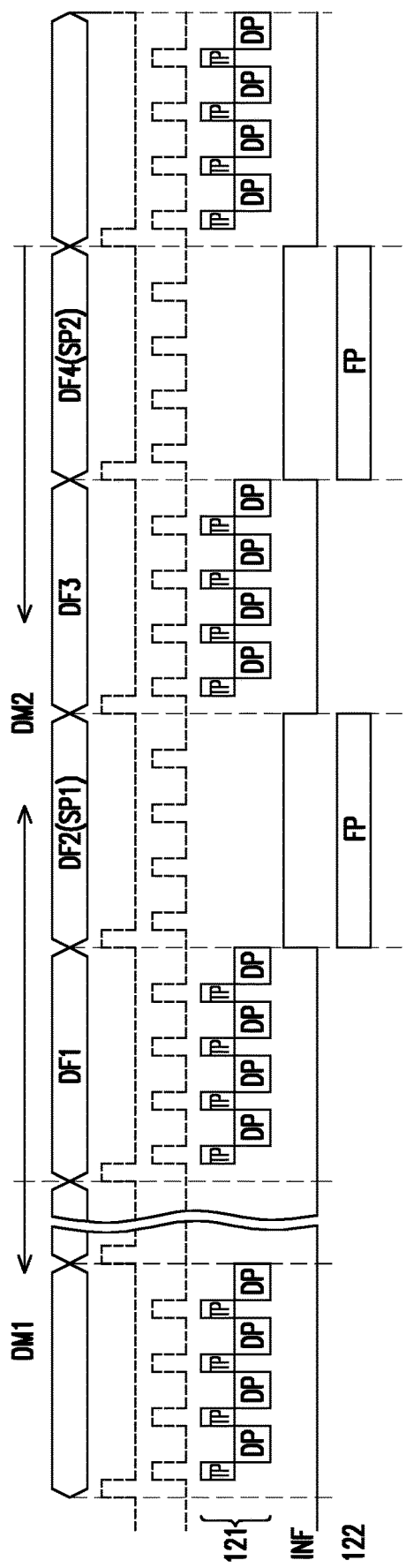
FIG. 4A and FIG. 4B are schematic timing diagrams illustrating the operating method of FIG. 2 is applied according to another embodiment of the invention.
Figure 4B:
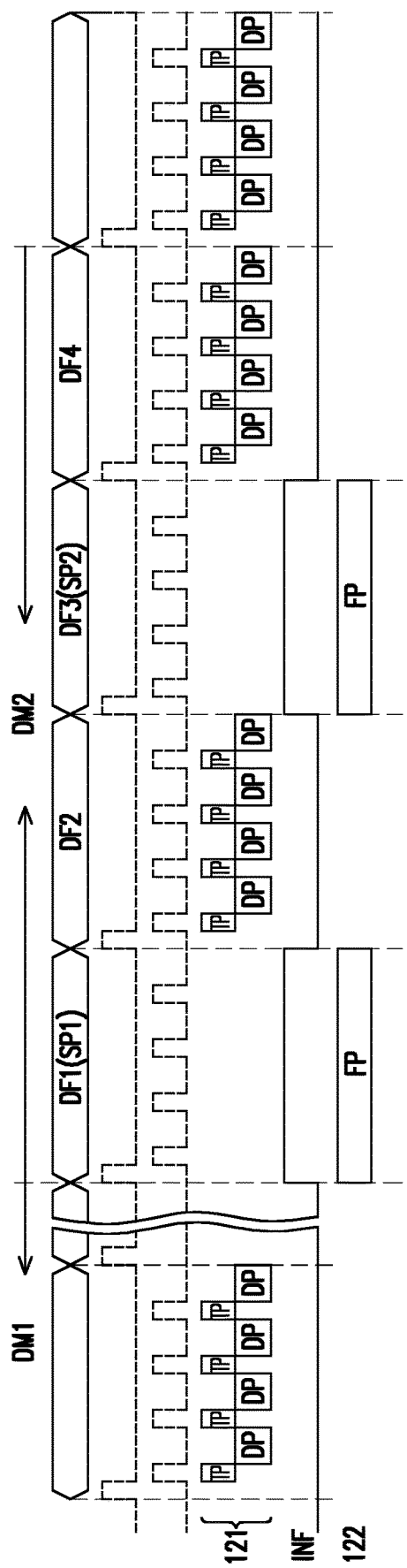

FIG. 4A and FIG. 4B are exemplary schematic timing diagrams illustrating the operating method of FIG. 2 is applied according to another embodiment of the invention. The lateral axis illustrated in FIG. 4A and FIG. 4B represents the time. A plurality of frame periods illustrated in FIG. 4A include frame periods DF1, DF2, DF3, DF4 are during the second driving mode DM2, which is the frame skip mode, is operating. Frame period preceding to the frame period DF1 are during the first driving mode DM1 is operating, and the frame period DF1, DF2, DF3, DF4 are two operating cycles of the frame skip mode. The frame periods DF2 and DF4 are configured to be skip periods SP1 and SP2, the frame periods DF1 and DF3 are configured to be active periods, and the active period comes first in each operating cycle. The frame skip mode illustrated in FIG. 4B is similar and the difference between FIG. 4A and FIG. 4B is that in FIG. 4B, the skip period comes first in each operating cycle of the frame skip mode. In the embodiment illustrated in FIG. 4B, the frame periods DF1 and DF3 are configured to be the skip periods SP1 and SP2.

Referring to FIG. 4A, the first driving circuit 121 performs the display driving operation DP and the touch sensing operation TP (i.e., the first driving mode) on the panel 110 during the frame periods before the frame period DF1. The display driving operation DP and the touch sensing operation TP are performed time-divisionally. During the frame periods DF2 and DF4 as the skip periods, the first timing control signal INF output from the first driving circuit 121 is in the high logic level (indicating that both the display driving operation DP and the touch sensing operation TP are suspended and that means the fingerprint sensing operation FP can be set to enable (active)). Thus, the second driving circuit 122 performs the fingerprint sensing operation FP according to the first timing control signal INF. In some embodiments, the fingerprint sensing operation in the frame period DF2 (as the skip period SP1) may be a reset operation, to reset the fingerprint sensor array of the panel 110, and the fingerprint sensing operation in the frame period DF4 (as the skip period SP2) may be a readout operation, to readout the fingerprint sensing results from the fingerprint sensor array of the panel 110. The reset operation and the readout operation may be performed row by row. For each fingerprint sensor row, a period between the reset operation is completed and the readout operation starts is an exposure period. How the first driving circuit 121 and the second driving circuit 122 operate in such a timing sequence of FIG. 4A or FIG. 4B can be referred to the description of FIG. 1 to FIG. 3, which will not be repeated.

Figures 16A, 16B:
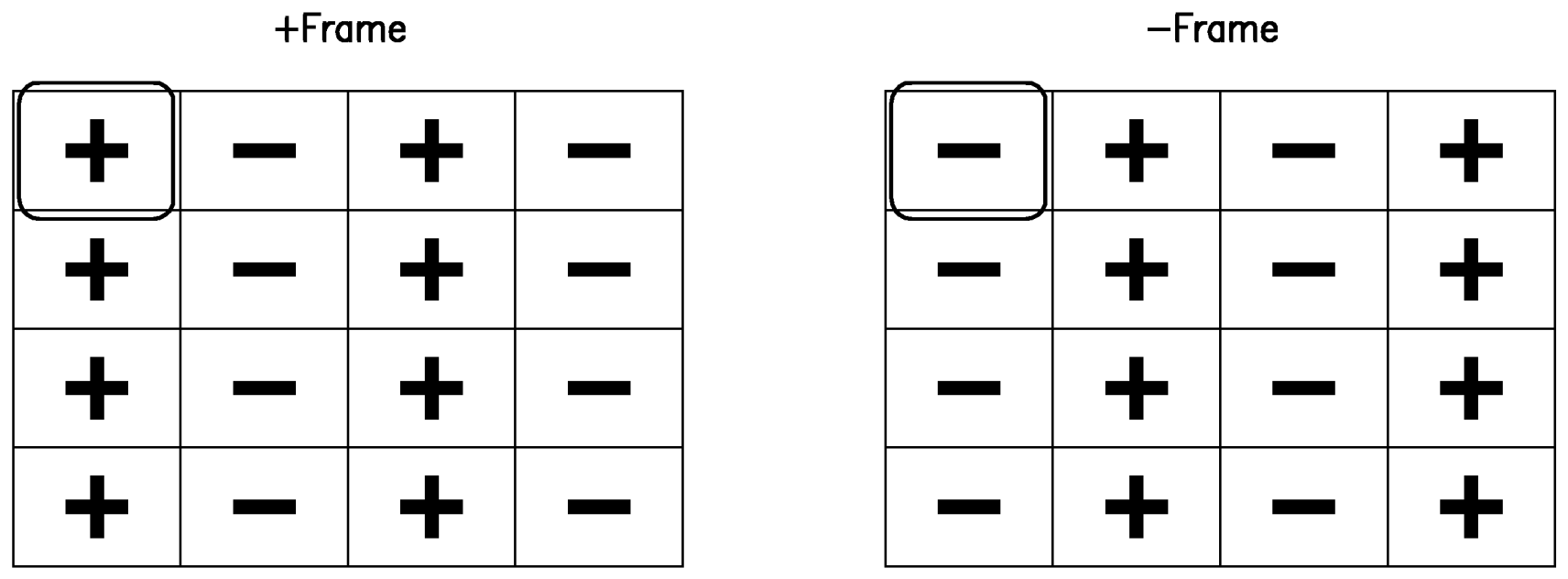

In some embodiments, the first driving circuit 121 may utilize a polarity inversion technique to drive the panel 110 to display the image frame. Generally, modes of the frame polarity inversion include a dot inversion mode, a column inversion mode of other modes. No matter what mode of the frame polarity inversion is, each pixel of the panel 110 needs to switch the polarity from displaying a current frame to display a next frame, which means the polarity of each pixel is switched between a positive polarity (generally labeled as "+") and a negative polarity (generally labeled as "−"), such that the polarity of a frame (called frame polarity hereinafter) also switches. FIGS. 16A and 16B are schematic diagrams illustrating two adjacent display frames with column inversion according to an embodiment of the invention. In the example shown in FIGS. 16A and 16B, one display frame has 4*4 pixels. Referring to FIGS. 16A and 16B illustrating the column inversion mode, a polarity sequence (a polarity configuration) of pixel columns of the image frame having the positive polarity, from left to right, may be "+−+− . . . ", and a polarity sequence (a polarity configuration) of pixel columns of the image frame having the negative polarity, from left to right, may be "−+−+ . . . ". The frame polarity may be defined according to the polarity of a pixel in a fixed position, such as the polarity of the left-most pixel in the upmost pixel row of the display pixel array, as shown in FIGS. 16A and 16B. For convenience of explanation, the polarity configuration of the display frame shown in FIG. 16A is called a positive frame polarity (+Frame), and the polarity configuration of the display frame shown in FIG. 16B is called a negative frame polarity (−Frame).

Figures 17A, 17B:
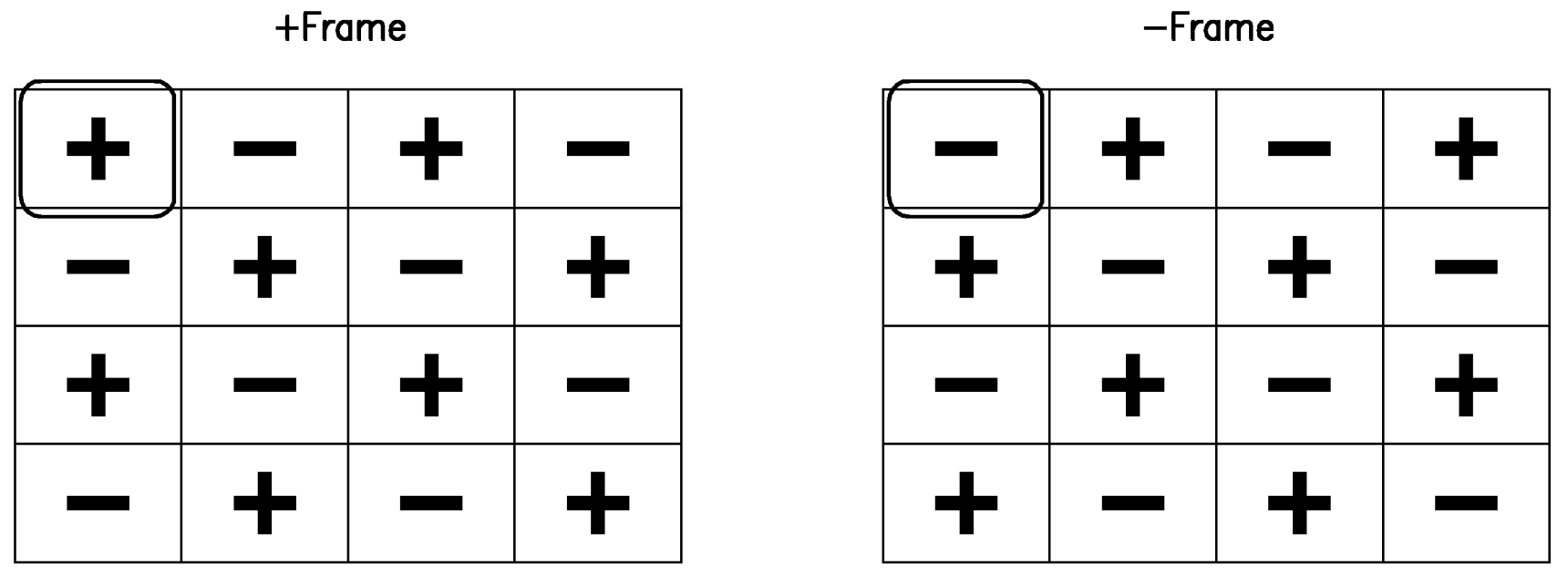

Another example of frame polarity is shown in FIGS. 17A and 17B, which are schematic diagrams illustrating two adjacent display frames with dot inversion according to another embodiment of the invention. In the embodiment shown in FIGS. 17A and 17B, one display frame has 4*4 pixels. For convenience of explanation, the polarity configuration of the display frame shown in FIG. 17A is called a positive frame polarity (+Frame), and the polarity configuration of the display frame shown in FIG. 17B is called a negative frame polarity (−Frame).

The fingerprint image quality may be associated with the frame polarity that the display panel retains during the fingerprint sensing operation (i.e. reset operation and readout operation) is performed. Depending on panels by different panel manufacturers, the fingerprint image quality may be worse in a condition that the frame polarity retains positive during the fingerprint sensing operation than in another condition that the frame polarity retains negative, or vice versa. An unexpected retained frame polarity or unexpected frame polarity inversing happening during the fingerprint sensing operation may generate a background noise pattern included in the fingerprint image and thereby influence the fingerprint image quality. The enhanced operating method may help eliminate the background noise pattern. In another embodiment of the present invention, an enhanced operating method based on the operation method of FIG. 2 may be utilized for improving the fingerprint image quality which is reduced due to the unexpected retained frame polarity or frame polarity inversion.

Figure 5A:
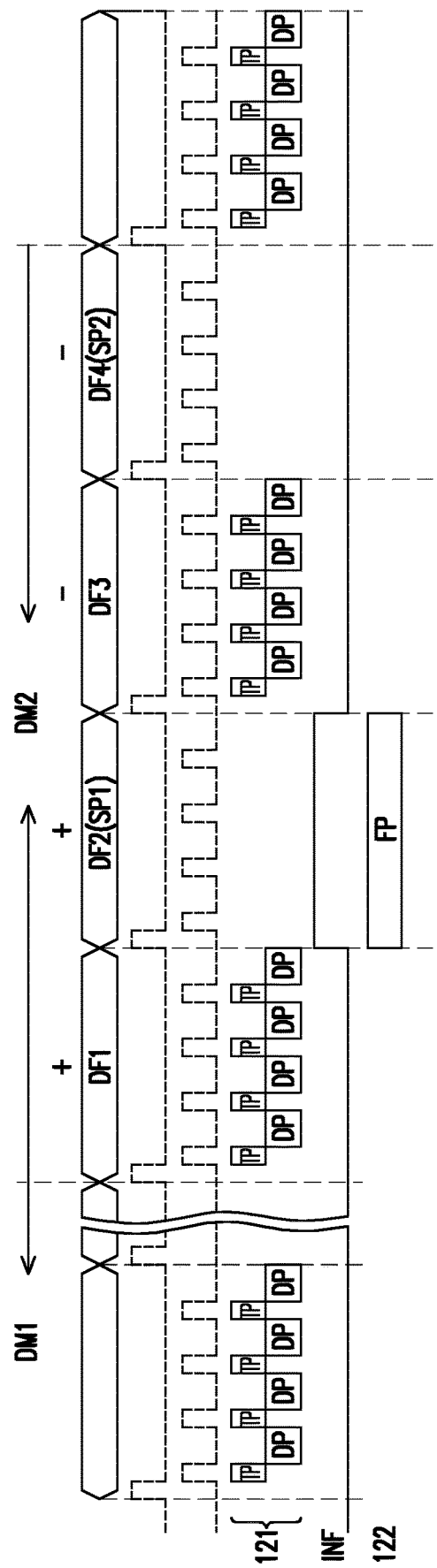
FIG. 5A and FIG. 5B are schematic timing diagrams illustrating a plurality of frame periods according to yet another embodiment of the invention.
Figure 5B:
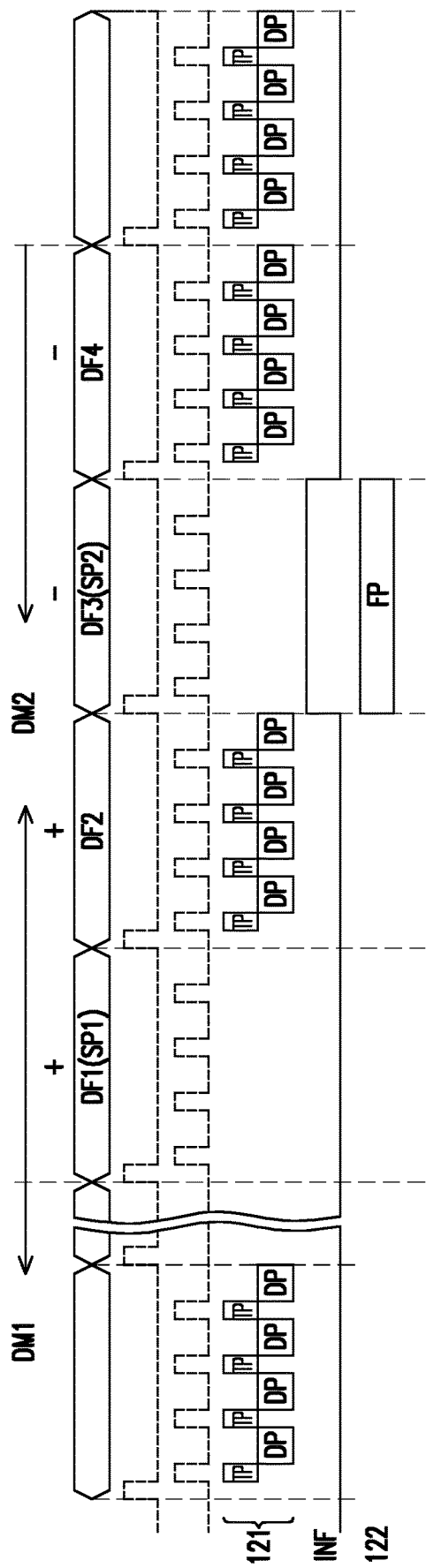

FIG. 5A and FIG. 5B are exemplary schematic timing diagrams illustrating a plurality of frame periods according to the enhanced operating method. In the embodiment illustrated in FIG. 5A and FIG. 5B, the quality of the fingerprint image may be prevented from being influenced by the frame polarity inversion as much as possible. The lateral axes illustrated in FIG. 5A and FIG. 5B represent the time. Frame periods DF1, DF2, DF3, DF4 are two operating cycles of the second driving mode DM2 (e.g., the frame skip mode). Frame polarity during the frame period DF2 (as a skip period SP1) retains positive polarity which is same as the frame polarity of the preceding frame period DF1, and frame polarity during the frame period DF4 (as a skip period SP2) retains negative polarity same as the preceding frame period DF3. As illustrated in FIG. 5A, if retaining positive frame polarity during the fingerprint sensing operation results in a better fingerprint image, the second driving circuit 122 performs the fingerprint sensing operation only in skip periods during which the retained frame polarity conforms to the positive frame polarity, i.e. only in the frame period DF2 (as the skip period SP1), according to the first timing control signal INF. The first timing control signal INF shown in FIGS. 5A and 5B carriers not only information associated with the fingerprint sensing operation but also carries information of a frame polarity, which is the retained frame polarity during the skip period. The second driving circuit 122 does not perform the fingerprint sensing operation during the frame period DF4, since the retained frame polarity during the frame period DF4 is negative frame polarity. On the other hand, if retaining negative frame polarity during the fingerprint sensing operation results in a better fingerprint image, the display apparatus 120 may operates following the timing sequence of FIG. 5B. Based on FIG. 5B, the second driving circuit 122 performs the fingerprint sensing operation only in skip periods during which the retained frame polarity conforms to the negative frame polarity, i.e. only in the frame period DF4 (as the skip period SP2). The second driving circuit 122 does not perform the fingerprint sensing operation during the frame period DF2, since the retained frame polarity during the frame period DF2 is positive frame polarity. How the first driving circuit 121 and the second driving circuit 122 operate in such a timing sequence of FIG. 5A or FIG. 5B can be referred to the description of FIG. 1 to FIG. 3, which will not be repeated.

The above enhanced operating method may help eliminate the background noise pattern. On the other side, if the background noise pattern can be obtained by processing the fingerprint image at the AP 130 in advance, the second driving circuit 122 does not need to suspend performing the fingerprint sensing operation in the skip period during which the retained frame polarity affects the fingerprint image quality. That is, the fingerprint sensing operation is performed regardless of the retained frame polarity during the skip periods. Referring to FIG. 4A and FIG. 4B, which also have frame polarity inversion even though the frame polarity symbols are omitted in the figures. The second driving circuit 122 may perform the fingerprint sensing operation in two of the skip periods SP1 and SP2 even though the retained frame polarities in the skip periods SP1 and SP2 are different. e.g., positive frame polarity in the skip period SP1 and negative frame polarity in the skip period SP2.

According to the above enhanced operating method, the first driving circuit 121 still suspends performing at least one of the display driving operation and the touch sensing operation during the skip periods under the second driving mode, but the second driving circuit 122 is configured to perform the fingerprint sensing operation during skip periods only when the retained frame polarity conforms to an expected frame polarity that is less influence to the fingerprint image. In some other embodiments, in the skip period during which the retained frame polarity is not the expected frame polarity, the first driving circuit 112 may resume the operation as it does in the active period, instead of suspending at least one of the display driving operation and the touch sensing operation.

Figure 6:
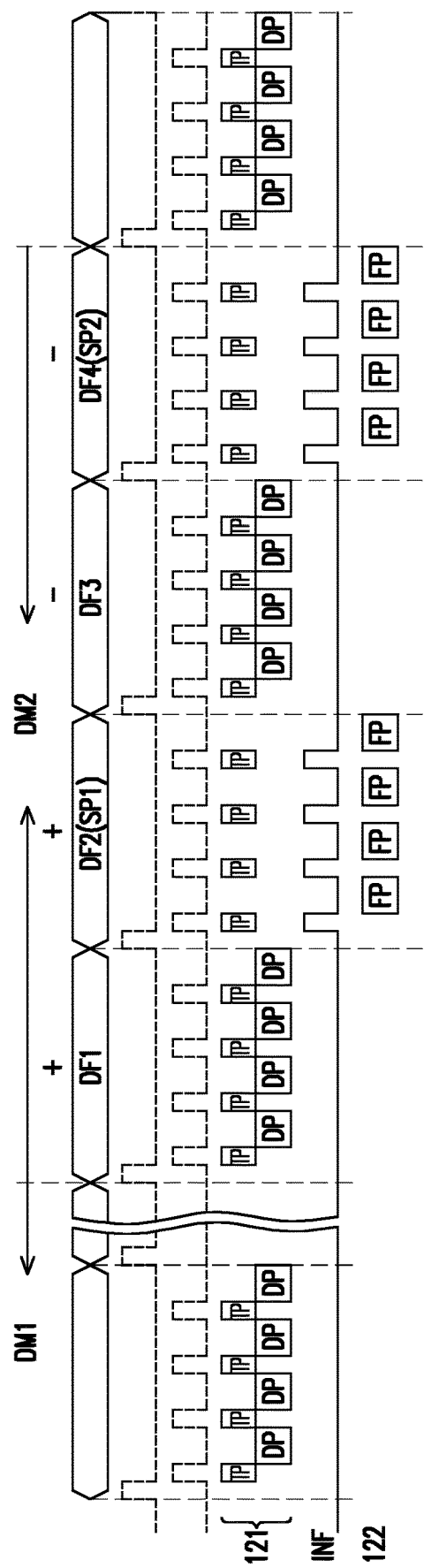
FIG. 6 is a schematic timing diagram illustrating a plurality of frame periods according to still another embodiment of the invention.

FIG. 6 is an exemplary schematic timing diagram illustrating a plurality of frame periods according to still another embodiment of the invention. The lateral axis illustrated in FIG. 6 represent the time. The first driving unit 121 performs the first driving mode DM1 during frame periods preceding to the frame period DF1 and performs the second driving mode DM2 during the frame periods DF1, DF2, DF3 and DF4. During the frame periods DF2 and DF4 as skip periods SP1 and SP2, the first driving circuit 121 does not suspend performing both the display driving operation touch sensing operation but suspends performing only the display driving operation and keeps performing the touch sensing operation. The second driving circuit 122 performs the fingerprint sensing operation during the skip periods SP1 and SP2 according to the first timing control signal INF. The first driving circuit 121 and the second driving circuit 122 respectively perform the touch sensing operation and the fingerprint sensing operation time-divisionally during the skip period, which means touch sensing intervals (or called touch terms, denoted by TP) and fingerprint sensing intervals (or called fingerprint terms, denoted by FP) do not overlap during the skip period. In the example of FIG. 6, the first timing control signal INF may indicate not only when the display driving operation is suspended in the second driving mode (which means the fingerprint sensing operation can be set to enabled) but also when the touch sensing operation is performed, such as indicating four touch sensing intervals as shown in FIG. 6, such that the second driving circuit 122 may be aware of what time to perform the fingerprint sensing operation based on a time-division manner. The timing sequence of the first timing control signal INF during the skip periods may be set similar to a touch term synchronization signal.

Figure 7A:
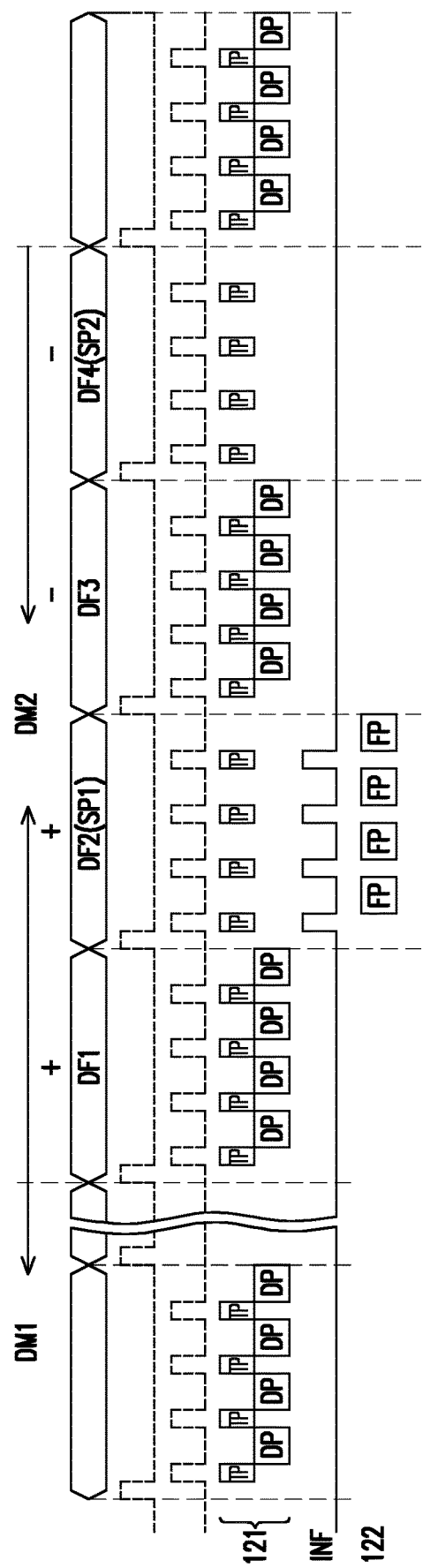
FIG. 7A and FIG. 7B are schematic timing diagrams illustrating a plurality of frame periods according to yet another embodiment of the invention.
Figure 7B:
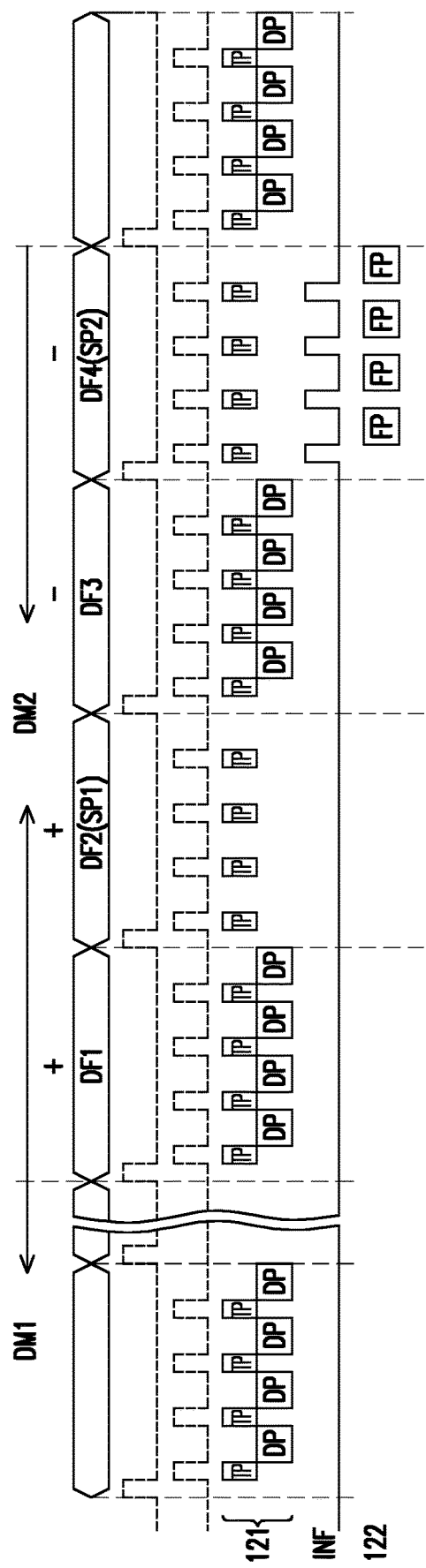

FIG. 7A and FIG. 7B are exemplary schematic timing diagrams illustrating a plurality of frame periods according to yet another embodiment of the invention. By using the aforementioned enhanced operating method, the driving apparatus 120 may operate following the timing sequence such as in FIG. 7A or FIG. 7B. It is noted that the difference between FIG. 6 and FIG. 7A (or 7B) is that in the example of FIGS. 7A and 7B, the second driving circuit 122 considers the retained frame polarity during each skip period and suspend performing the fingerprint sensing operation in some skip periods. The detailed operation of the aforementioned enhanced operating method can be referred to the descriptions regarding to FIGS. 5A and 5B and are not repeated herein. The difference between FIGS. 7A-7B and FIGS. 5A-5B is that both the display driving operation and touch sensing operation are suspended during the skip period in FIGS. 5A-5B, whereas only the display driving operation is suspended during the skip period FIGS. 7A-7B. The first timing control signal INF shown in FIGS. 7A and 7B carriers not only information associated with the fingerprint sensing operation (which are time-divisionally performed with the touch sensing operation) but also carries information of a frame polarity, which is the retained frame polarity during the skip period. The number of the operating cycles in the second driving mode, the number of frame periods (N) used as an active period and the number of frame periods (M) used as a skip period under the second driving mode shown in every figures are examples.

Figure 8:
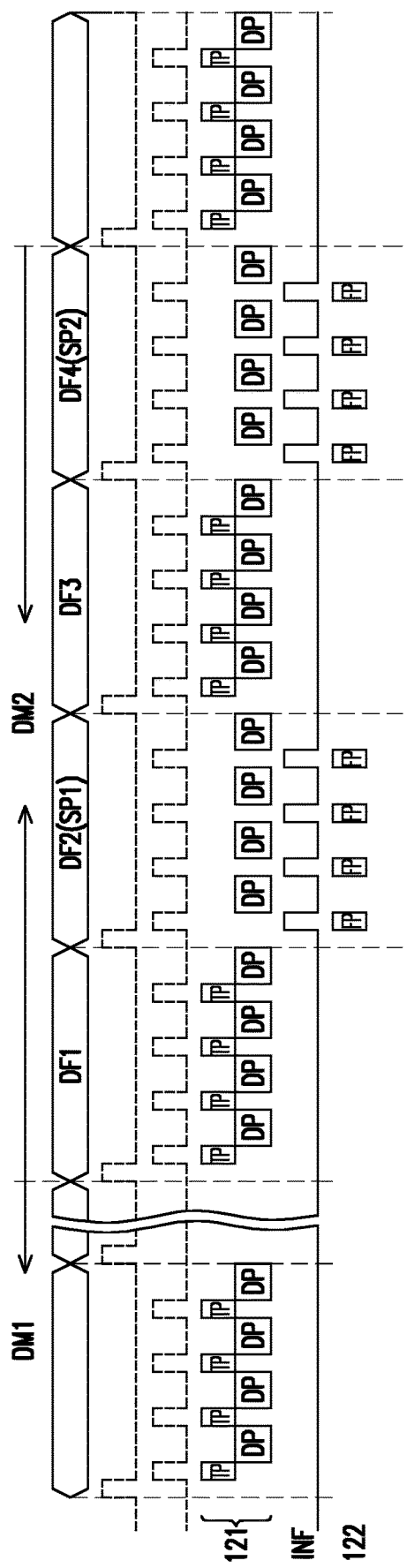
FIG. 8 is a schematic timing diagram illustrating a plurality of frame periods according to still another embodiment of the invention.

FIG. 8 is an exemplary schematic timing diagram illustrating a plurality of frame periods according to still another embodiment of the invention. The lateral axis illustrated in FIG. 8 represents the time. The first driving unit 121 performs the first driving mode DM1 during frame periods preceding to the frame period DF1 and performs the second driving mode DM2 during the frame periods DF1, DF2, DF3 and DF4. During the frame periods DF2 and DF4 as skip periods SP1 and SP2, the first driving circuit 121 does not suspend performing both the display driving operation and touch sensing operation but suspends performing only the touch sensing operation and keeps performing the display driving operation. The second driving circuit 122 performs the fingerprint sensing operation during the skip periods SP1 and SP2 according to the first timing control signal INF. The first timing control signal INF of FIG. 8 indicates what time the display driving operation is suspended (and in another aspect, it indicates the information associated with when the touch sensing operation is enabled and when the fingerprint sensing operation is enabled). The first driving circuit 121 and the second driving circuit 122 respectively perform the display driving operation and the fingerprint sensing operation time-divisionally during the skip period.

Figure 9A:
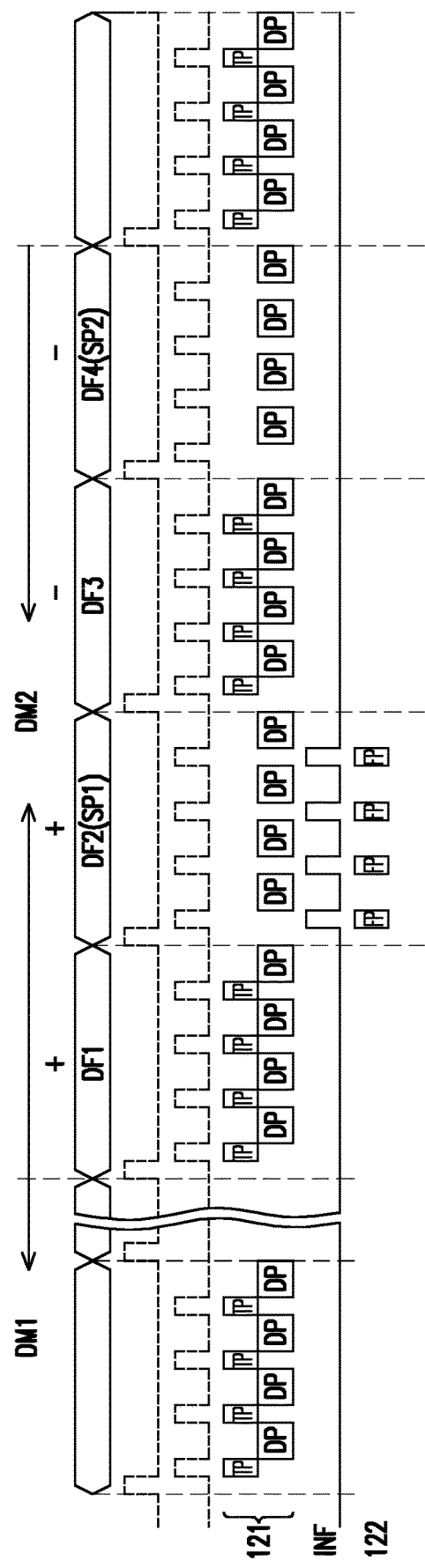
FIG. 9A and FIG. 9B are schematic timing diagrams illustrating a plurality of frame periods according to another embodiment of the invention.
Figure 9B:
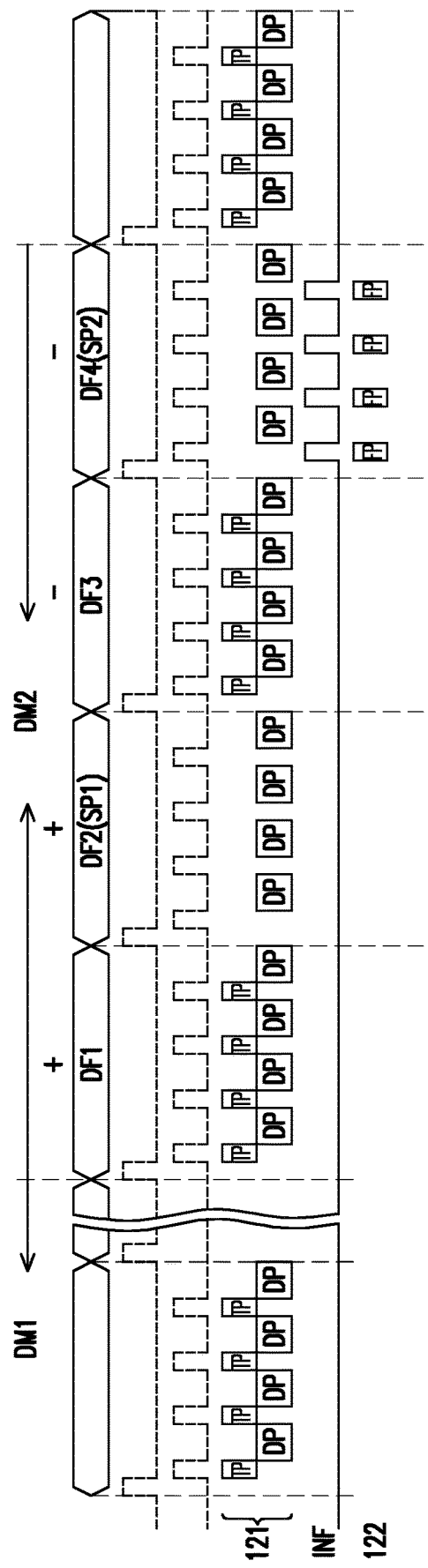

FIG. 9A and FIG. 9B are schematic timing diagrams illustrating a plurality of frame periods according to another embodiment of the invention. By using the aforementioned enhanced operating method, the driving apparatus 120 may operate following the timing sequence such as in FIG. 9A or FIG. 9B. It is noted that the difference between FIG. 8 and FIG. 9A (or 9B) is that in the example of FIGS. 9A and 9B, the second driving circuit 122 considers the retained frame polarity during each skip period and suspend performing the fingerprint sensing operation in some skip periods. The detailed operation of the aforementioned enhanced operating method can be referred to the descriptions regarding to FIGS. 5A and 5B and are not repeated herein. The first timing control signal INF shown in FIGS. 9A and 9B indicates not only information associated with the fingerprint sensing operation (which are time-divisionally performed with the display driving operation) but also information of a frame polarity, which is the retained frame polarity during the skip period.

Figure 10:
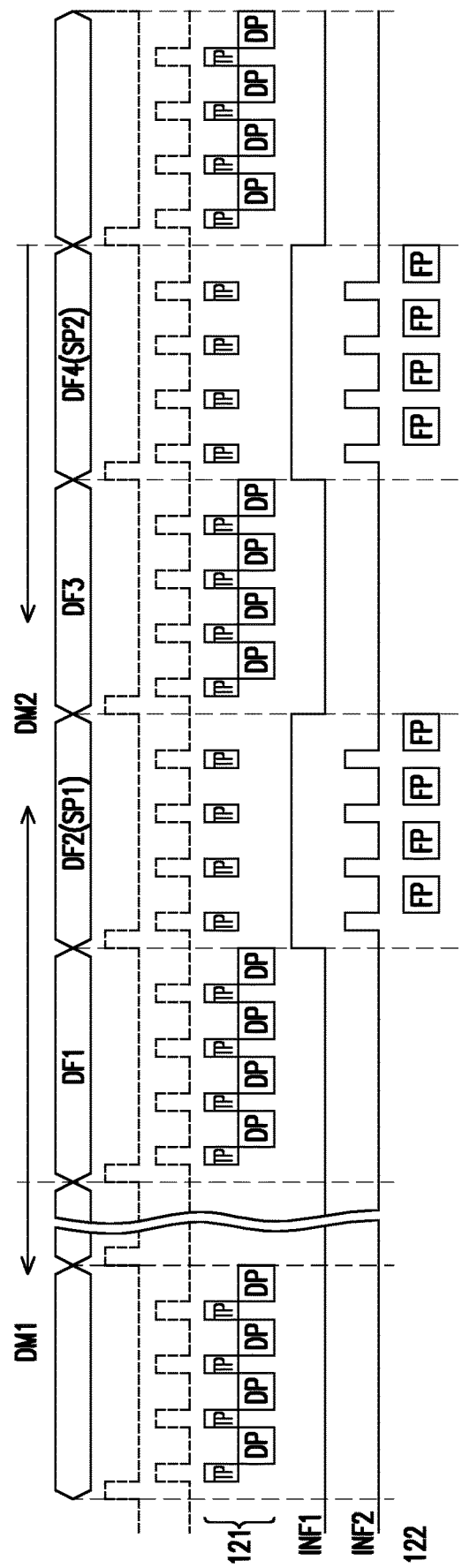
FIG. 10 is a schematic timing diagram illustrating a plurality of frame periods according to yet another embodiment of the invention.

FIG. 10 is an exemplary schematic timing diagram illustrating a plurality of frame periods according to yet another embodiment of the invention. The lateral axis illustrated in FIG. 10 represents the time. A plurality of frame periods illustrated in FIG. 10 include frame periods DF1, DF2, DF3, DF4 and DF5. In the embodiment illustrated in FIG. 10, the frame period DF2 is configured as the skip period SP1, and the frame period DF4 is configured as the skip period SP2. In the embodiment illustrated in FIG. 10, the timing control signal INF includes control signals INF1 and INF2. During the frame periods DF2 and DF4 as skip periods SP1 and SP2, the first driving circuit 121 does not suspend performing both the display driving operation and the touch sensing operation but suspends performing only the display driving operation and keeps performing the touch sensing operation. The second driving circuit 122 performs the fingerprint sensing operation during the skip periods SP1 and SP2 according to a timing control signal INF1 and another timing control signal INF2, which is a different way from the first timing control signals in FIG. 6. The timing control signal INF2 is similar to the first timing control signal INF of FIG. 6. The timing control signal INF2 may indicate not only when the display driving operation is suspended in the second driving mode (which means the fingerprint sensing operation can be set to enabled) but also when the touch sensing operation is performed, such as indicating four touch sensing intervals, such that the second driving circuit 122 may be aware of what time to perform the fingerprint sensing operation based on a time-division manner. The timing sequence of the timing control signal INF2 during the skip periods may be set similar to a touch term synchronization signal. The timing control signal INF1 may indicate the skip period by using a specific logic level such as a logic high level (and indicate other time by using a logic low level). By using the timing control signal INF1, the second driving circuit 122 may be assured to be ready for performing the fingerprint sensing operation earlier than the case of using only the timing control signal INF2.

Figure 11A:
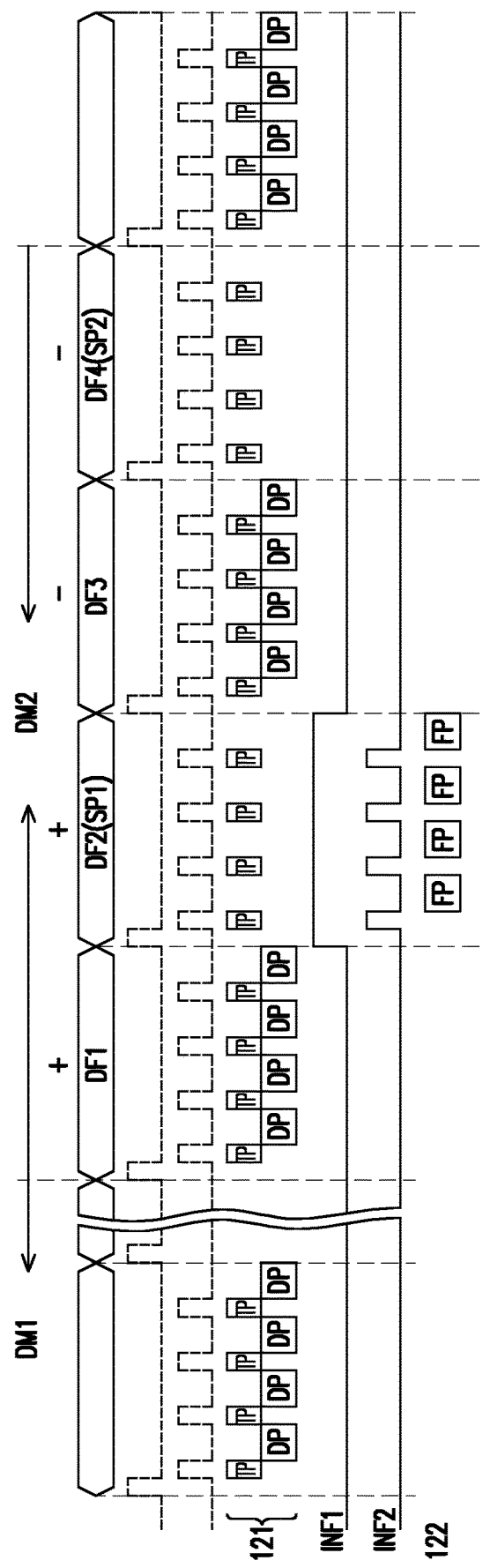
FIG. 11A and FIG. 11B are schematic timing diagrams illustrating a plurality of frame periods according to still another embodiment of the invention.
Figure 11B:
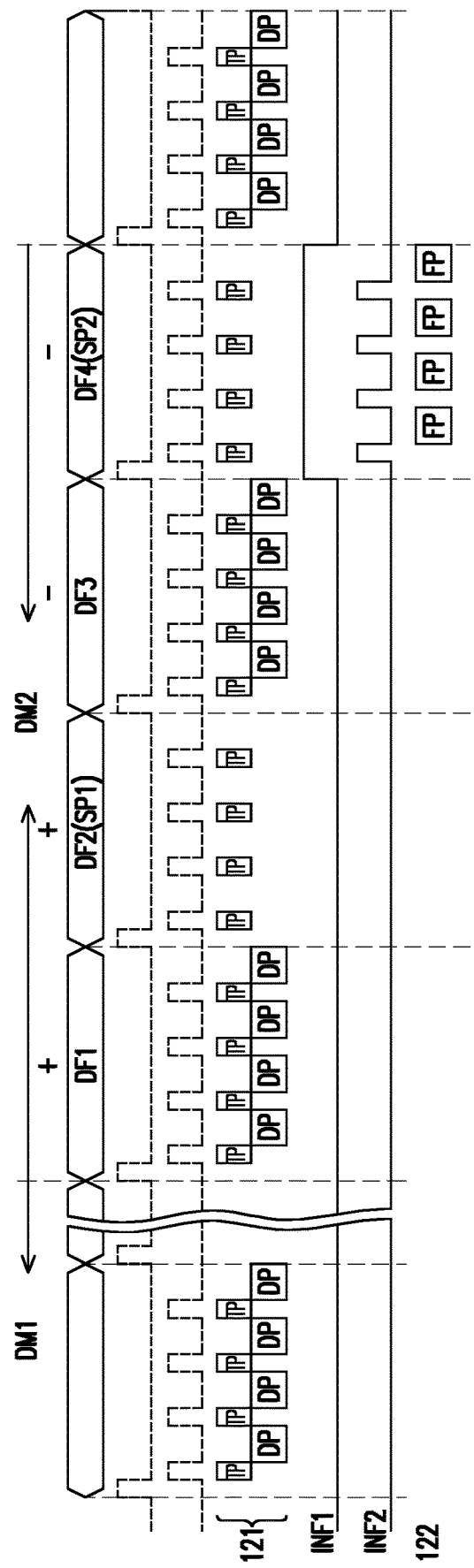

FIG. 11A and FIG. 11B are exemplary schematic timing diagrams illustrating a plurality of frame periods according to still another embodiment of the invention. It is noted that the difference between FIG. 10 and FIG. 11A (or 11B) is that in the example of FIGS. 11A and 11B, the second driving circuit 122 considers the retained frame polarity during each skip period and suspend performing the fingerprint sensing operation in some skip periods, for improving fingerprint image quality. In FIGS. 11A and 11B, the second driving circuit 122 performs the fingerprint sensing operation during the skip periods SP1 and SP2 according to a timing control signal INF1 and another timing control signal INF2 which is slightly different from FIG. 10. The timing control signal INF1 and the timing control signal INF2 of FIGS. 11A and 11B further carries information of the retained frame polarity during the skip period. The detailed operation regarding to frame polarity consideration may be referred to the descriptions regarding to FIGS. 5A and 5B and are not repeated herein.

Figure 12:
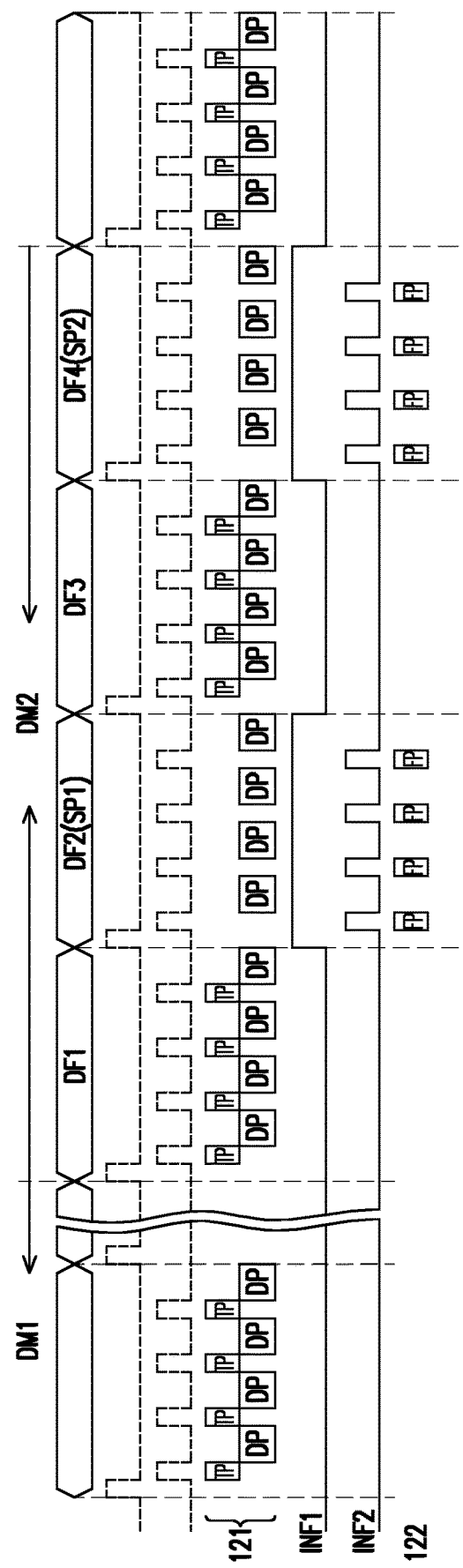
FIG. 12 is a schematic timing diagram illustrating a plurality of frame periods according to yet another embodiment of the invention.

FIG. 12 is an exemplary schematic timing diagram illustrating a plurality of frame periods according to yet another embodiment of the invention. The lateral axis illustrated in FIG. 12 represents the time. The first driving unit 121 performs the first driving mode DM1 during frame periods preceding to the frame period DF1 and performs the second driving mode DM2 during the frame periods DF1, DF2, DF3 and DF4. During the frame periods DF2 and DF4 as skip periods SP1 and SP2, the first driving circuit 121 does not suspend performing both the display driving operation and touch sensing operation but suspends performing only the touch sensing operation and keeps performing the display driving operation. The second driving circuit 122 performs the fingerprint sensing operation during the skip periods SP1 and SP2 according to a timing control signal INF1 and another timing control signal INF2, which is a different way from the first timing control signals in FIG. 8. The timing control signal INF2 is similar to the first timing control signal INF of FIG. 8. The timing control signal INF2 of FIG. 12 indicates what time the display driving operation is suspended (and in another aspect, it indicates the information associated with when the touch sensing operation is enabled and when the fingerprint sensing operation is enabled). The first driving circuit 121 and the second driving circuit 122 respectively perform the display driving operation and the fingerprint sensing operation time-divisionally during the skip period. The timing sequence of the timing control signal INF2 during the skip periods may be set similar to a touch term synchronization signal. The timing control signal INF1 of FIG. 12 may indicate the skip period by using a specific logic level such as a logic high level (and indicate other time by using a logic low level). By using the timing control signal INF1, the second driving circuit 122 may be assured to be ready for performing the fingerprint sensing operation earlier than the case of using only the timing control signal INF2.

Figure 13A:
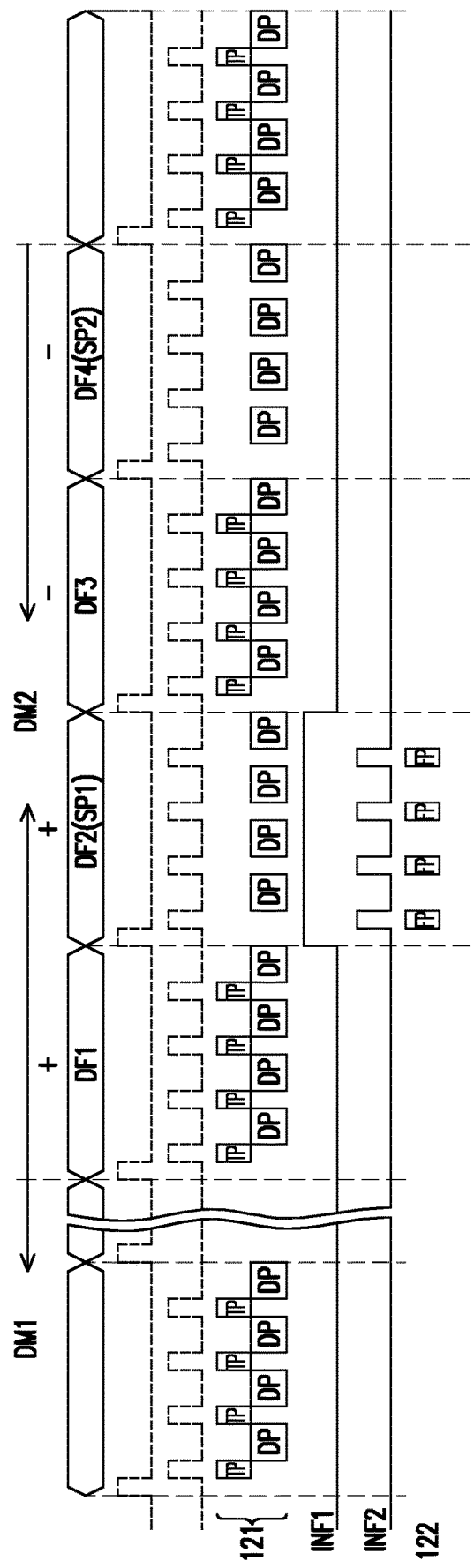
FIG. 13A and FIG. 13B are schematic timing diagrams illustrating a plurality of frame periods according to still another embodiment of the invention.
Figure 13B:
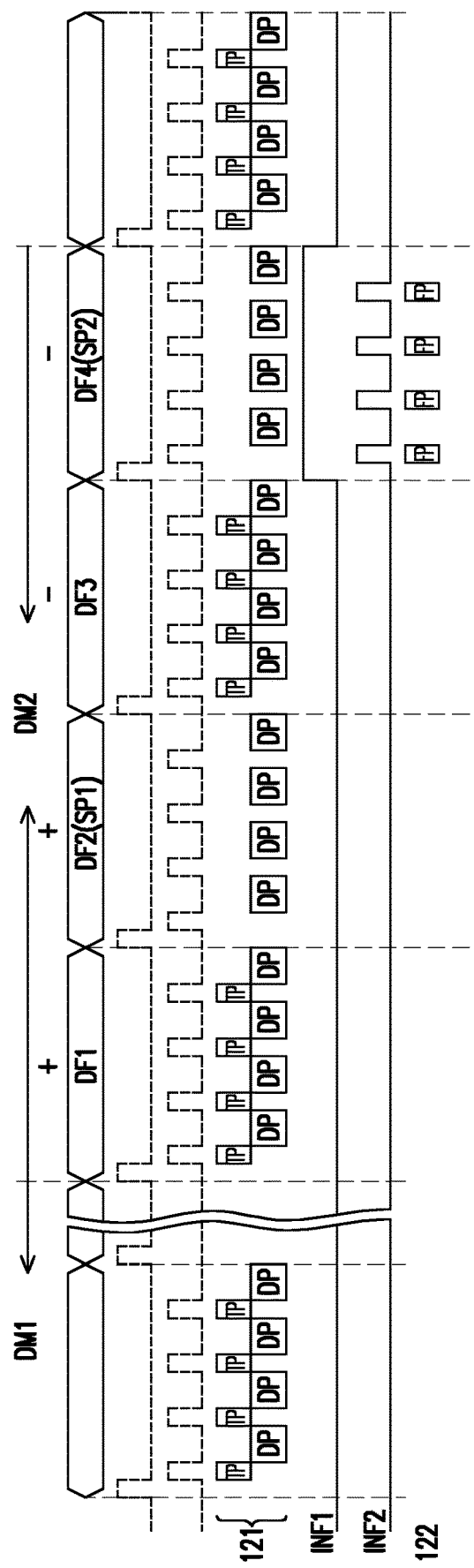

FIG. 13A and FIG. 13B are exemplary schematic timing diagrams illustrating a plurality of frame periods according to still another embodiment of the invention. It is noted that the difference between FIG. 12 and FIG. 13A (or 13B) is that in the example of FIGS. 13A and 13B, the second driving circuit 122 considers the retained frame polarity during each skip period and suspend performing the fingerprint sensing operation in some skip periods, for improving fingerprint image quality. A timing control signal INF1 and another timing control signal INF2 in FIGS. 13A and 13B is slightly different from FIG. 12. The timing control signal INF1 and the timing control signal INF2 of FIGS. 13A and 13B further carries information of the retained frame polarity during the skip period. The detailed operation regarding to frame polarity consideration may be referred to the descriptions regarding to FIGS. 5A and 5B and are not repeated herein.

Figure 14A:
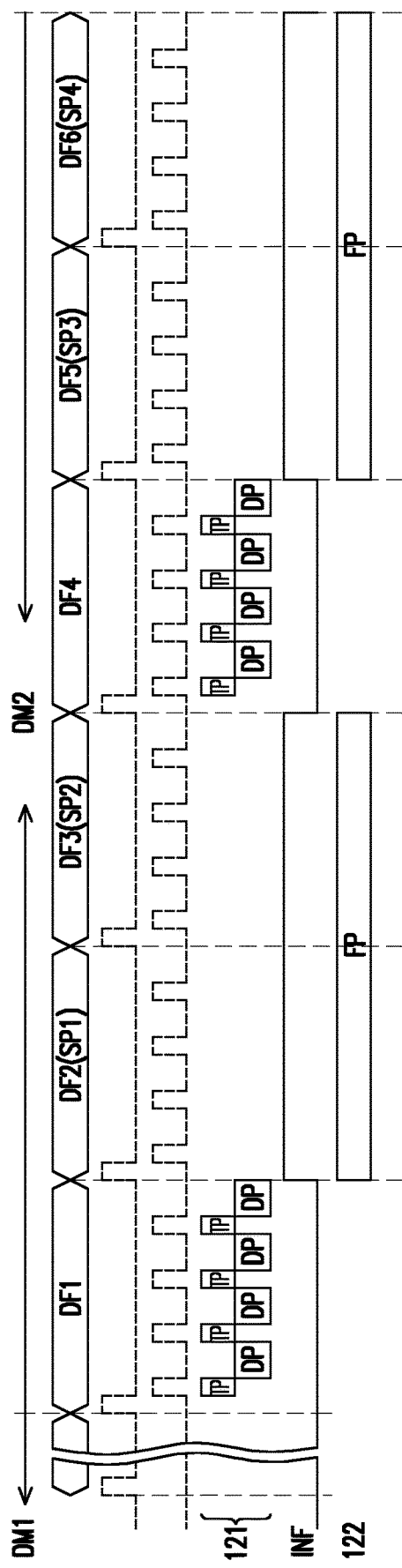
FIG. 14A and FIG. 14B are schematic timing diagrams illustrating a plurality of frame periods according to still another embodiment of the invention.
Figure 14B:
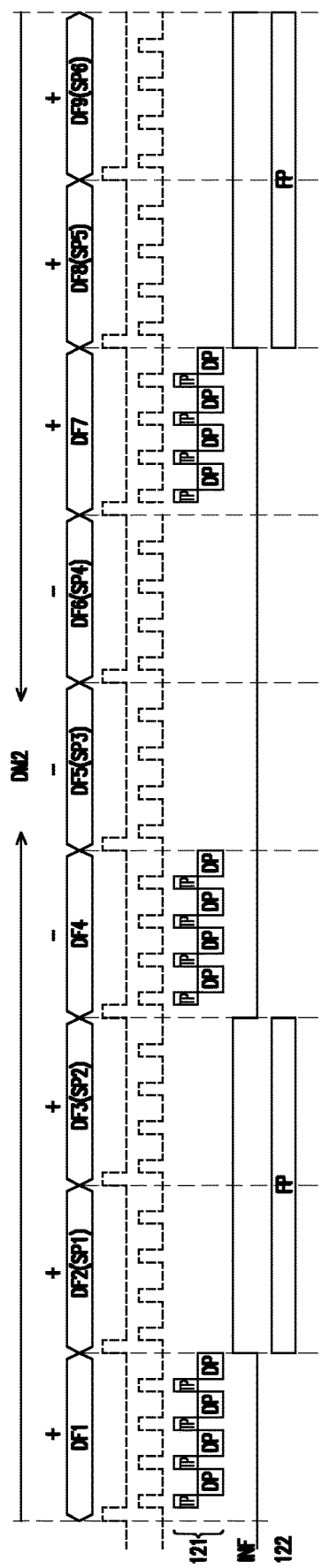

FIG. 14 is an exemplary schematic timing diagram illustrating a plurality of frame periods according to still another embodiment of the invention. The lateral axis illustrated in FIG. 14 represents the time. In the example of FIG. 14, an operating cycle of the second driving mode DM2 (the frame skip mode) include an active period consisting of one frame period (e.g. DF1) and a skip period consisting of two frame periods (e.g. DF2 and DF3, also denoted by SP1 and SP2). The detailed operation may be referred to the descriptions of FIGS. 1-3, 4A and 4B and are not repeated herein.

Figure 15:
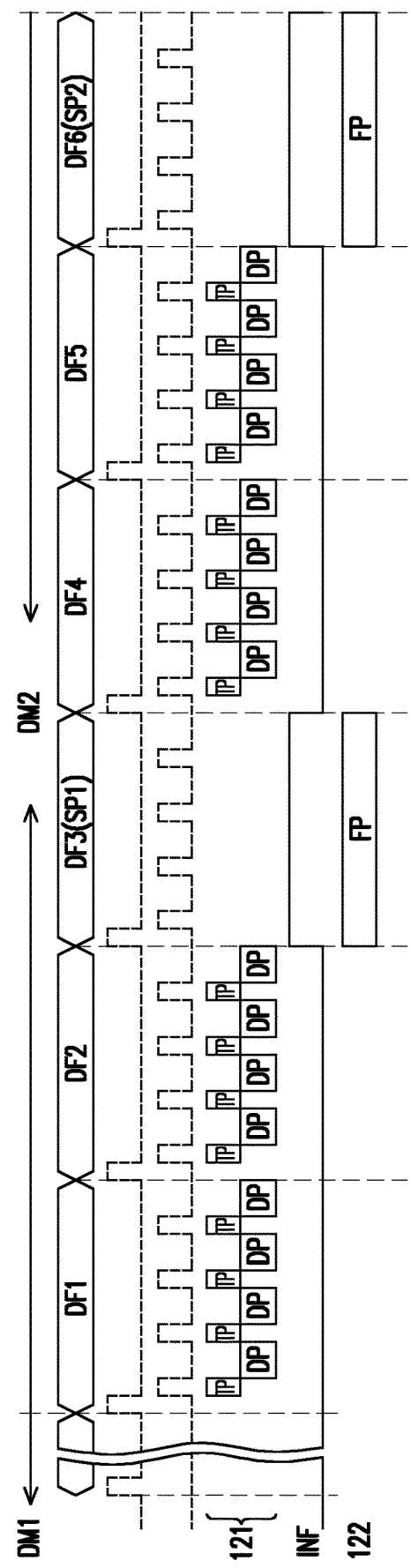
FIG. 15 is a schematic timing diagram illustrating a plurality of frame periods according to further another embodiment of the invention.

FIG. 15 is an exemplary schematic timing diagram illustrating a plurality of frame periods according to further another embodiment of the invention. The lateral axis illustrated in FIG. 15 represents the time. In the example of FIG. 15, an operating cycle of the second driving mode DM2 (the frame skip mode) include an active period consisting of two frame period (e.g. DF1 and DF2) and a skip period consisting of one frame period (e.g. DF3, also denoted by SP1). The detailed operation may be referred to the descriptions of FIGS. 1-3, 4A and 4B and are not repeated herein.

Figure 18:
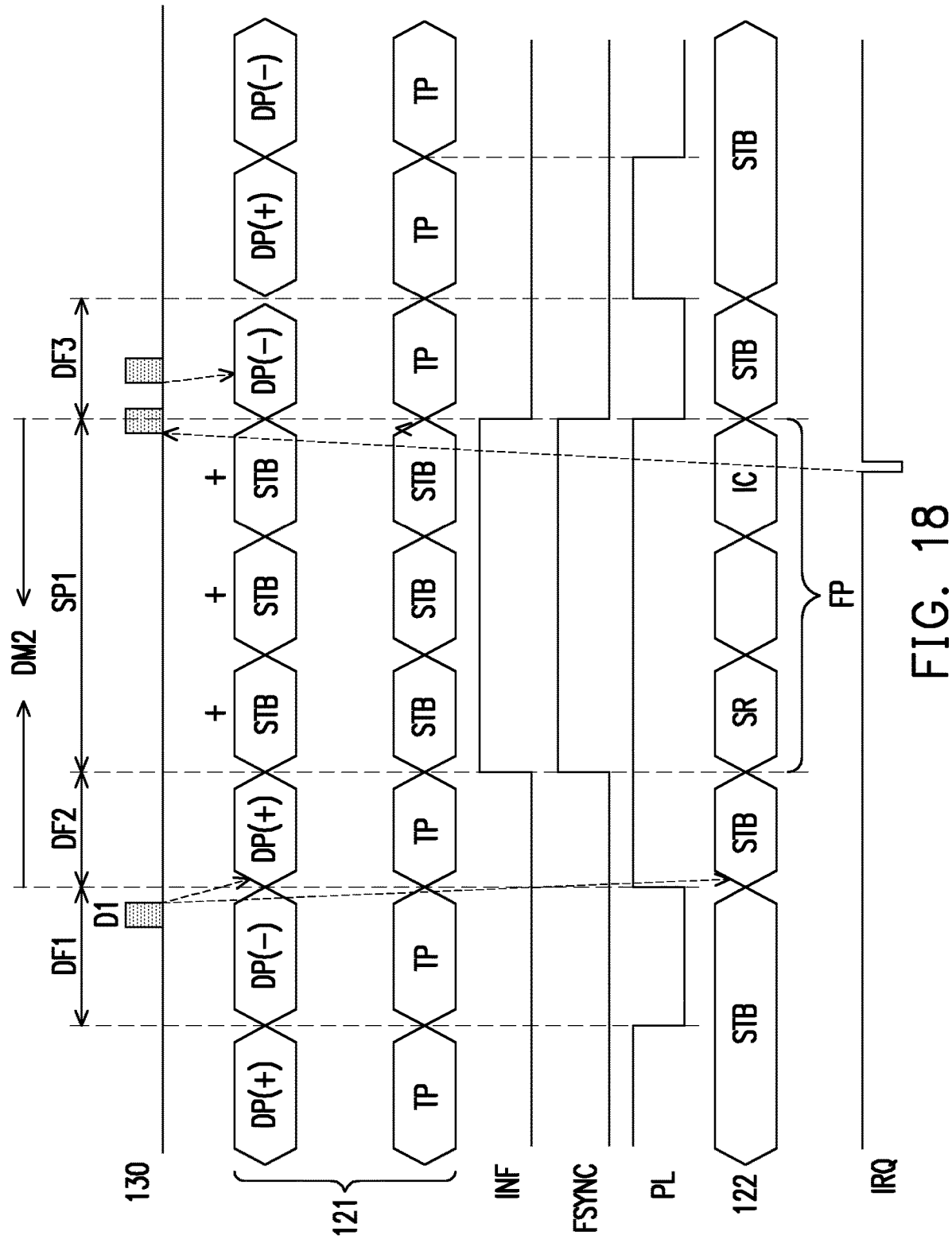
FIG. 18 is a schematic timing diagram illustrating a plurality of frame periods according to further another embodiment of the invention.
Figure 19:
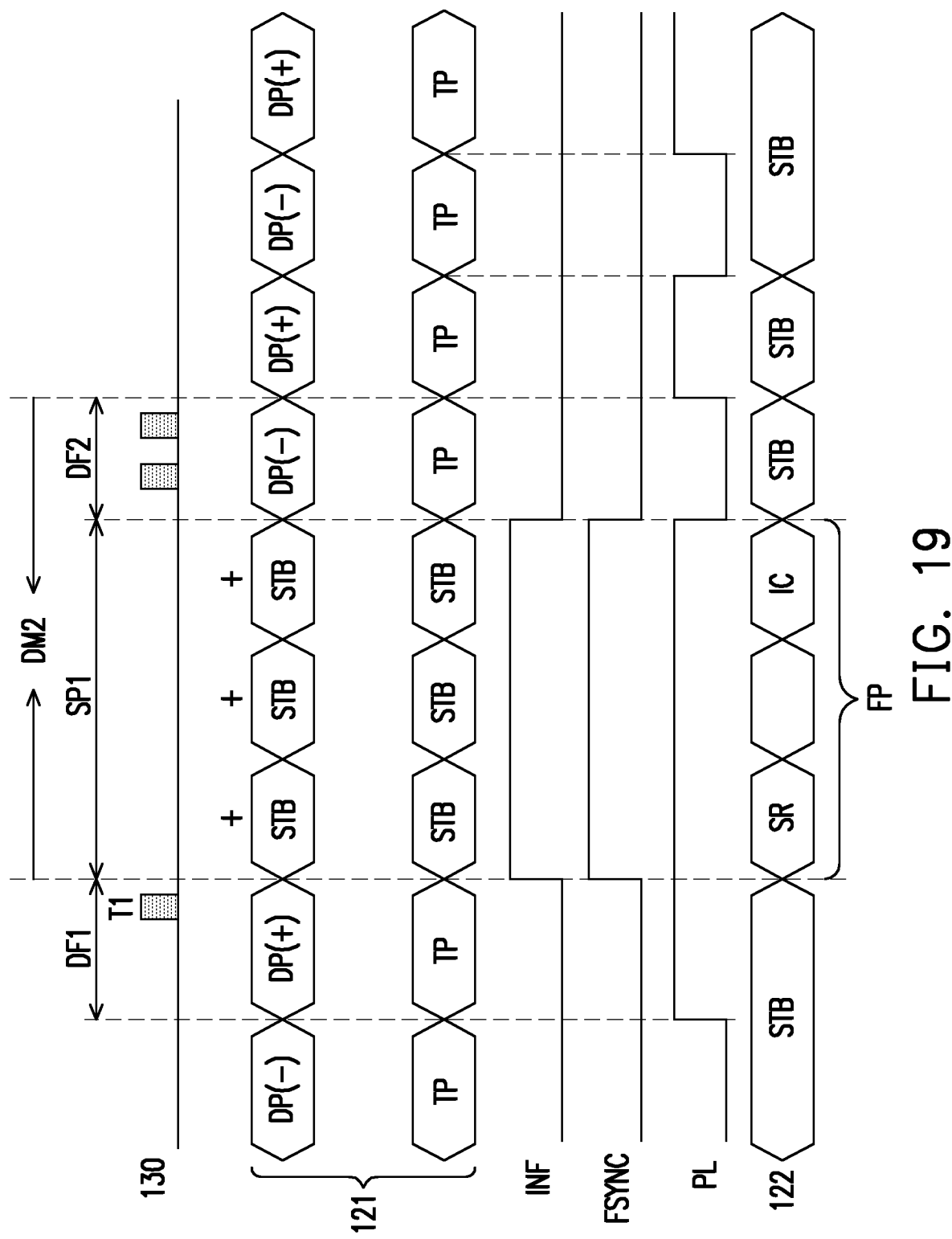
FIG. 19 is a schematic timing diagram illustrating a plurality of frame periods according to further another embodiment of the invention.

FIG. 18 and FIG. 19 are exemplary schematic timing diagrams illustrating a plurality of frame periods according to further another embodiment of the invention. The lateral axis illustrated in FIG. 18 and FIG. 19 represents the time. In the example of FIG. 18 and FIG. 19, an operating cycle of the second driving mode DM2 (the frame skip mode) include an active period consisting of one frame period and a skip period consisting of three consecutive frame periods. The detailed operation may be referred to the descriptions of FIGS. 1-3, 4A and 4B. The second driving circuit 122 may perform the reset operation (denoted by "SR") to reset the fingerprint sensor array during the first frame period of the skip period and perform the readout operation (denoted by "IC") to readout the fingerprint sensing results from the fingerprint sensor array during the third frame period of the skip period. The period between the reset operation is completed and the readout operation starts is an exposure period.

Another operating method is illustrated by FIGS. 18 and 19, and the difference between the operating method of FIG. 2 and the operating method illustrated in FIGS. 18 and 19 is that before entering the second driving mode (DM2), the first driving circuit 121 further considers the frame polarity. The first driving circuit 121 receives a command D1 informing of enabling the fingerprint sensing operation from the AP 130 during a current frame period DF1 (in the first driving mode DM1). In response to receiving the command D1, the first driving circuit 121 determines whether a frame polarity of a current displayed frame in the current frame period DF1 conforms to a preconfigured frame polarity, and determines to display or not to display one more frame immediately after the current frame period DF1 according to the detected frame polarity of the current display frame, and in such a way the second driving circuit 122 may be assured to perform the fingerprint sensing operation during the skip periods with the preconfigured frame polarity. When the frame polarity of the current displayed frame is determined to conform to the preconfigured frame polarity, the second driving circuit 122 starts performing the fingerprint sensing operation right after the current displayed frame is completely displayed; on the other side, when the frame polarity of the current displayed frame is determined to not conform to the preconfigured frame polarity, the first driving circuit 121 performs the display driving operation for one more frame period (i.e. additional frame period) immediately after the current frame period to display the additional frame. Therefore, this additional frame can be displayed with the preconfigured frame polarity such that the fingerprint sensing operation may be performed during subsequent frame periods with the preconfigured frame polarity (since the frame polarity retains when no display data update).

Referring to the example of FIG. 18, the preconfigured frame polarity is assumed to be positive frame polarity. After receiving the command D1 at the frame period DF1, the first driving circuit 121 determines that the frame polarity of the current displayed frame of the frame period DF1 is negative frame polarity, which does not conform to the preconfigured frame polarity. Accordingly, the first driving circuit 121 performs the display driving operation for one more frame period immediately after the current frame period DF1, which is the frame period DF2, to display the additional frame (having the preconfigured frame polarity). In such a way, the second driving circuit 122 performs the fingerprint sensing operation in the skip period SP1, during which the retained frame polarity is the same as the preconfigured frame polarity. The frame period DF2 for displaying the additional frame may be regarded as an active period of the first operating cycle of the second driving mode. After the second driving circuit 122 complete the readout operation, the second driving circuit 122 sends an interrupt to the AP 130, and the AP 130 sends another command to the first driving circuit 121, such that the first driving circuit 121 is able to return to a state same as before the second driving mode DM2 starts at the frame period DF3.

On the other side, referring to the FIG. 19, after receiving the command D1 at the frame period DF1, the first driving circuit 121 determines that the frame polarity of the current displayed frame of the frame period DF1 is the positive frame polarity, which conforms to the preconfigured frame polarity, thereby the second driving circuit 122 starts performing the fingerprint sensing operation right after the current displayed frame is completely displayed. After the second driving circuit 122 complete the readout operation, the second driving circuit 122 sends an interrupt to the AP 130, and the AP 130 sends another command to the first driving circuit 121, such that the first driving circuit 121 is able to return to a state same as before the second driving mode DM2 starts at the frame period DF2.

A timing control signal denoted by INF in FIGS. 18 and 19 is the same as the first timing control signal INF shown in FIG. 3 and FIGS. 4A and 4B. In some other embodiments, the single timing control signal INF in FIGS. 18 and 19 may be replaced with two timing control signals FSYNC and PL. The timing control signal FYSC dos not carries information of frame polarity and is similar to the first timing control signal INF shown in FIGS. 3 and 4A and 4B. The timing control signal FYSC indicates what time and how long at least one of the display driving operation and the touch sensing operation is suspended in the second driving mode DM2, and in the other aspect, the timing control signal FYSC indicates what time and how long the fingerprint sensing operation is performed. The timing control signal PL carries information of a frame polarity or information of frame polarity change (which means the logic level of PL changes when the frame polarity inverses). The second driving circuit 122 may perform the fingerprint sensing operation according to the timing control signal FSYC and the timing control signal PL.

Figure 20:
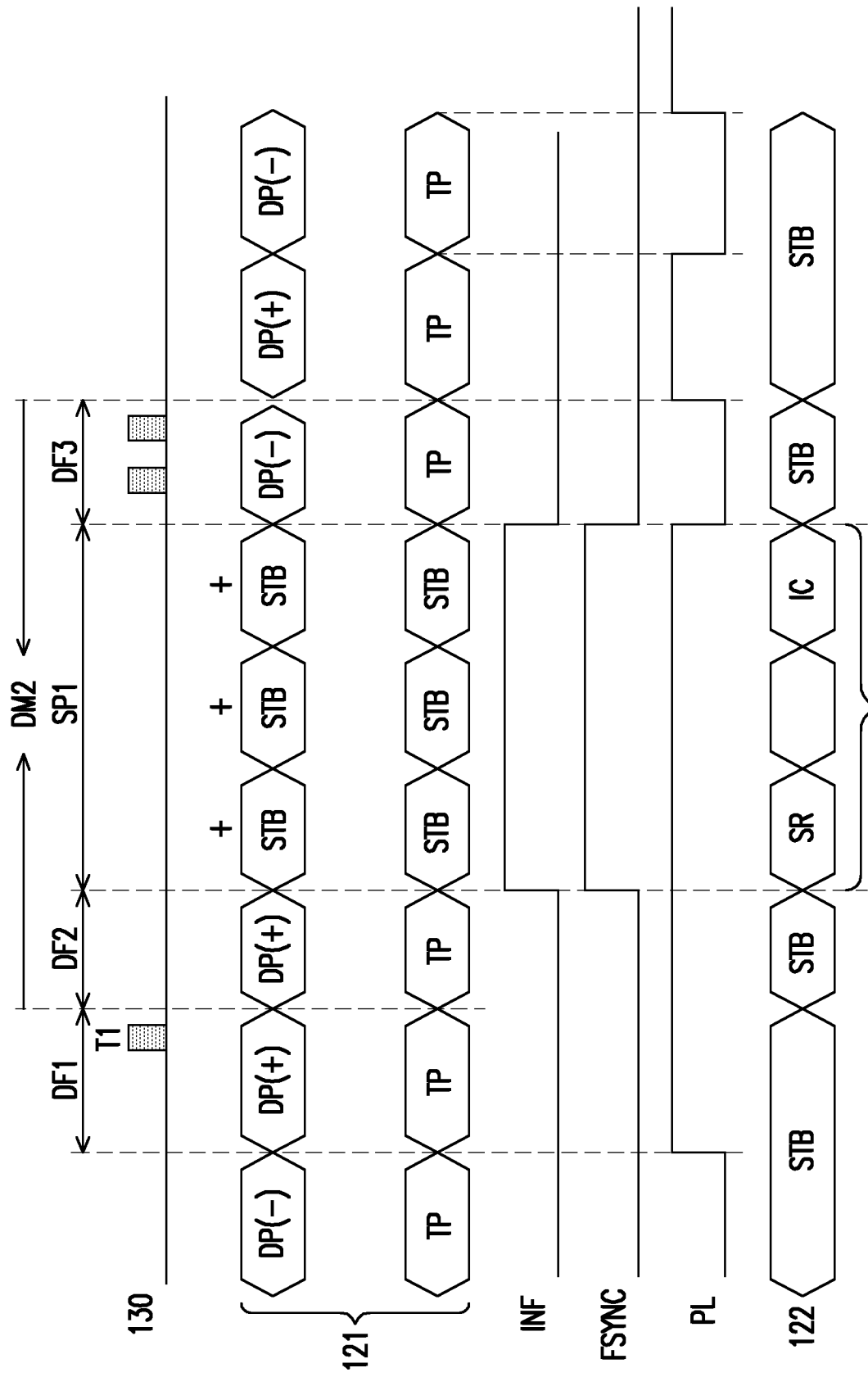
FIG. 20 is a schematic timing diagram illustrating a plurality of frame periods according to further another embodiment of the invention.

FIG. 20 is an exemplary schematic timing diagram illustrating a plurality of frame periods according to further another embodiment of the invention. Different from the operating method that generates the timing sequence shown in FIGS. 18 and 19, another operating method may lead to a different timing sequence illustrated in FIG. 20. The first driving circuit 121 receives a command D1 informing of enabling the fingerprint sensing operation from the AP 130 during a current frame period DF1 (in the first driving mode DM1). In response to receiving the command D1, the first driving circuit 121 performs at least the display driving operation to display one more frame (e.g. frame of the frame period DF2) having a preconfigured frame polarity (e.g. positive polarity) right before the fingerprint sensing operation starts, regardless of the frame polarity of a current displayed frame. In the example of FIG. 20, the frame polarity of the frame period DF1 is positive, ideally the frame polarity of the frame period DF2 is supposed to inverse to be negative so that the fingerprint sensing operating cannot start immediately after the frame period DF2. However, by using the operating method of displaying one more frame having the preconfigured frame polarity, the second driving circuit 122 is able to start performing the fingerprint sensing operation right after the frame period DF2 which is with the preconfigured frame polarity. The timing control signals shown in FIG. 20 may be referred to those in FIGS. 18 and 19.

Figure 21:
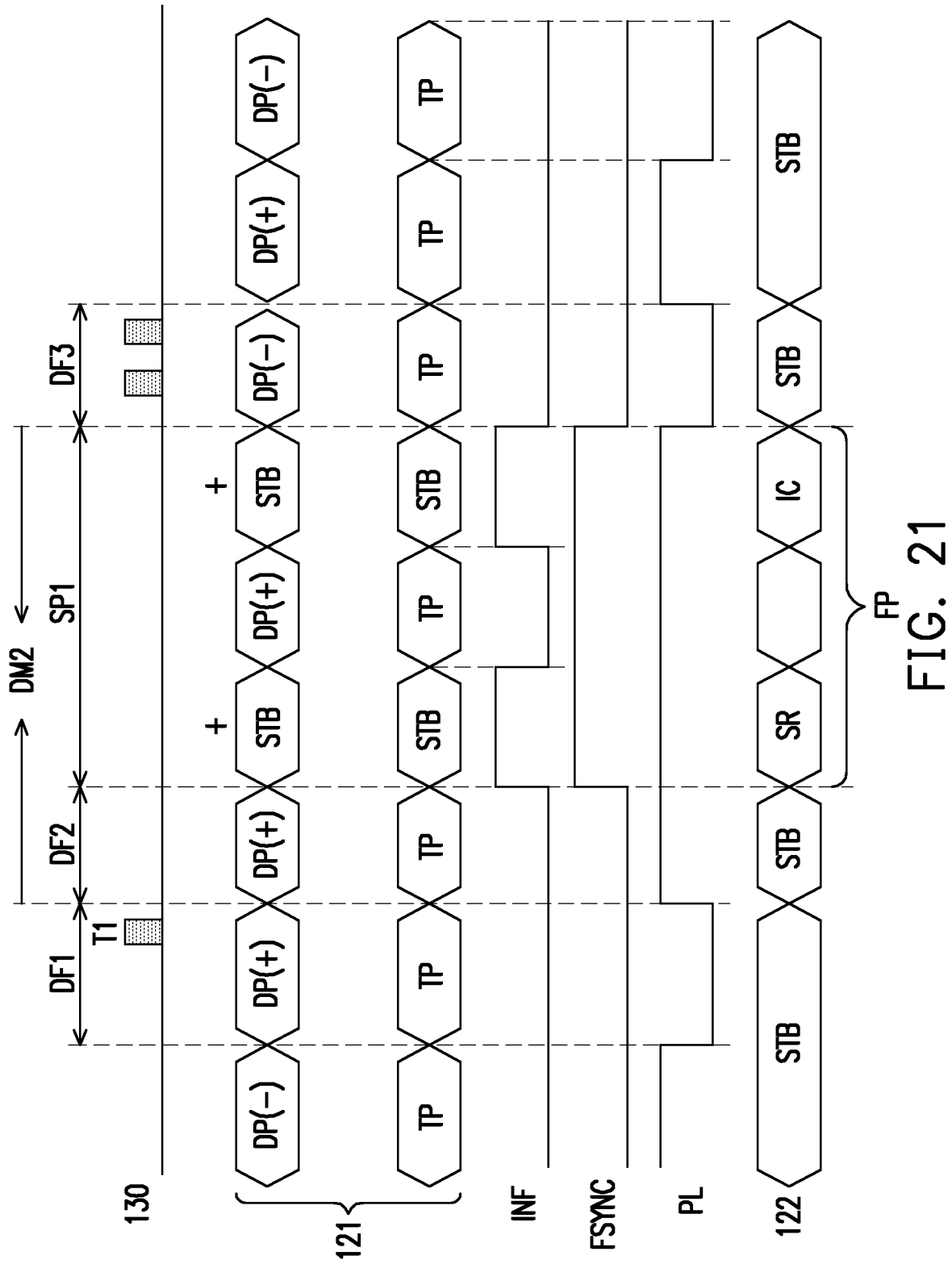
FIG. 21 is a schematic timing diagram illustrating a plurality of frame periods according to further another embodiment of the invention.

FIG. 21 is an exemplary schematic timing diagram illustrating a plurality of frame periods according to further another embodiment of the invention. In this example, an operating cycle of the second driving mode DM2 (the frame skip mode) include an active period consisting of one frame period and a skip period consisting of one frame period, not three consecutive frame periods. The operating method illustrated in FIG. 21 is that the first driving circuit 121 enforces every display frame in the active period of the second driving mode to be displayed with the preconfigured frame polarity (i.e. the frame polarity which is less influence to the fingerprint image quality), even though a display frame in the active period were supposed to be displayed with an opposite frame polarity. In such a way, the driving apparatus can assure that the fingerprint reset operation and readout operation are performed under the same retained frame polarity such that the background noise pattern may be eliminated.

Figure 22A:
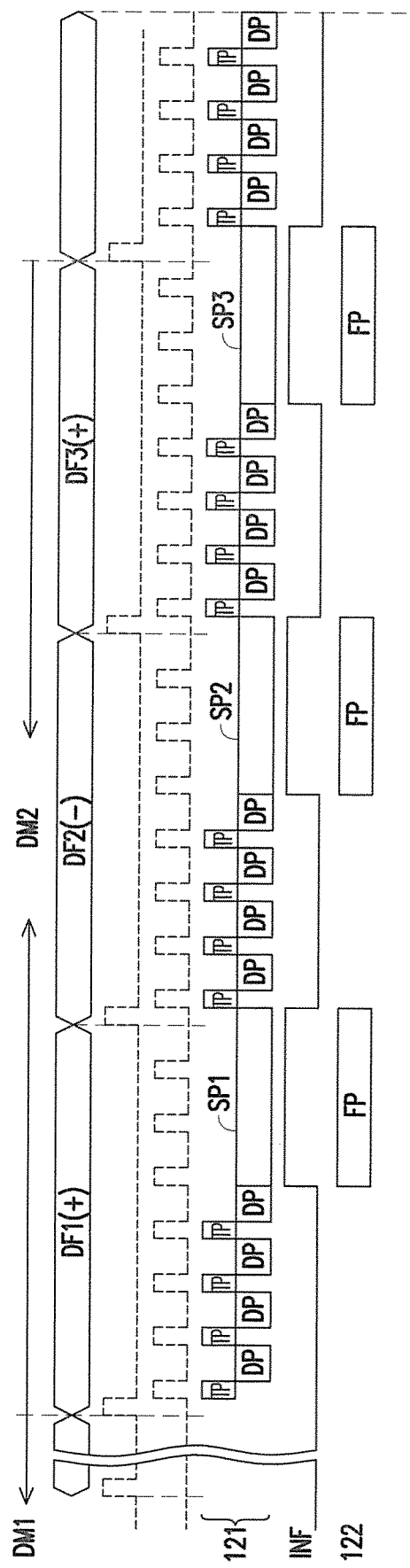
FIGS. 22A and 22B are schematic timing diagrams illustrating a plurality of frame periods according to further another embodiment of the invention.
Figure 22B:
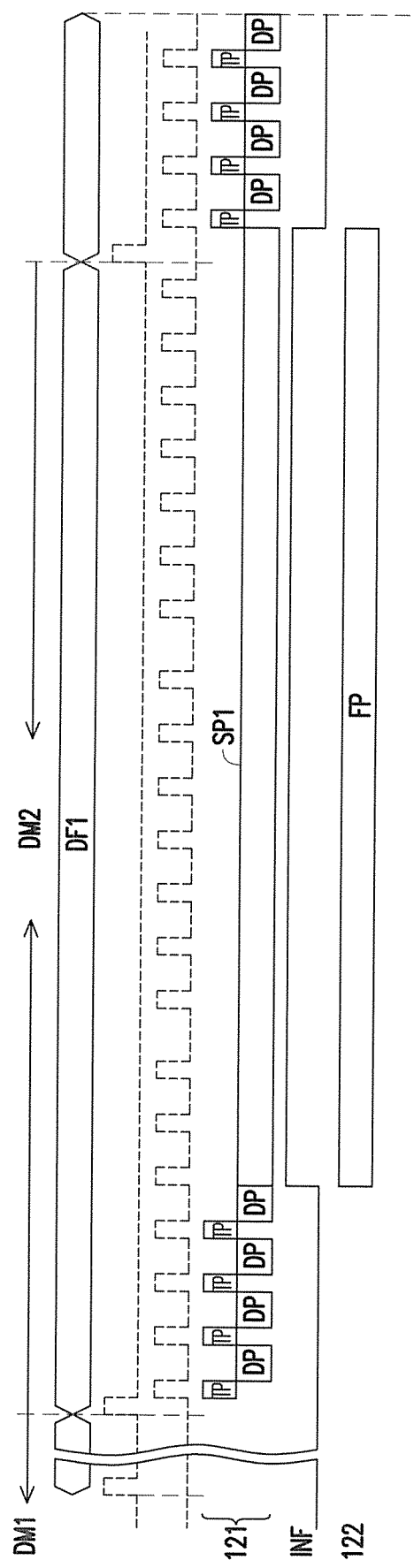

FIGS. 22A and 22B is an exemplary schematic timing diagram illustrating a plurality of frame periods according to further another embodiment of the invention. In FIGS. 22A and 22B, the second driving mode DM2 is the porch mode. The first driving circuit 121 is configured to periodically perform an operating cycle having a length same as a frame period in the porch mode. In FIG. 22A, the second driving mode includes three operating cycle, from the frame period DF1 to the frame period DF3. Every skip period (i.e. porch interval) in every operating cycle can be used for performing the fingerprint sensing operation, no matter what the retained frame polarity is during the skip period. In another embodiment, the first driving circuit 121 may perform the second driving mode by considering the retained frame polarity. In another embodiment shown in FIG. 22B, since length of the porch interval is configurable by the AP 130, a long porch interval (configured based on the consideration of acquiring a good fingerprint image and acceptable display frame rate) may be assigned to the first driving circuit 121 by the AP 130, such that the first driving circuit 121 may perform the second driving mode and the second driving circuit 122 may complete the fingerprint sensing operation during one operating cycle having a long skip period (long porch interval), instead of spending several operating cycles having short skip periods (short porch intervals, such as shown in FIG. 22A.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A driving apparatus, configured to drive a panel comprising a display pixel array, a touch sensor array and a fingerprint sensor array, the driving apparatus comprising:
a first driving circuit, configured to perform a first driving mode during a plurality of frame periods, perform a second driving mode after the plurality of frame periods, and output a first timing control signal associated with a fingerprint sensing operation in the second driving mode, wherein in the first driving mode, no fingerprint sensing operation is performed, but a display driving operation and a touch sensing operation are performed or merely the touch sensing operation is performed, and the first driving circuit suspends performing at least one of the display driving operation and the touch sensing operation during a skip period under the second driving mode, wherein the first driving circuit performs at least one of the display driving operation and the touch sensing operation outside the skip period under the second driving mode; and a second driving circuit, coupled to the first driving circuit to receive the first timing control signal, and configured to perform the fingerprint sensing operation during the skip period according to the first timing control signal.

2. The driving apparatus according to claim 1, wherein the first driving circuit performs the second driving mode in response to receiving a command from a core control processor, wherein the command indicates it is ready to sense a fingerprint and the first driving circuit reports a detected touch position to the core control processor before receiving the command.

3. The driving apparatus according to claim 1, wherein the first driving circuit is configured to periodically perform an operating cycle in the second driving mode, and wherein the operating cycle comprises N consecutive frame periods during which the first driving circuit performs at least touch sensing operation and M consecutive frame periods during which the first driving circuit suspends performing at least one of the display driving operation and the touch sensing operation, wherein N and M are integer and the skip period comprises the M consecutive frame periods.

4. The driving apparatus according to claim 3, wherein the first driving circuit is configured to perform the display driving operation to realize a first display frame rate under the first driving mode and perform the display driving operation to realize a second display frame rate lower than the first display frame rate during the N consecutive frame periods.

5. The driving apparatus according to claim 1, wherein the first driving circuit is configured to suspend performing at least one of the display driving operation and the touch sensing operation during a porch interval of each of frame periods in the second driving mode, and wherein the porch interval is the skip period and the length of the porch interval is configured by a core control processor of an electronic apparatus which comprises the panel and the driving apparatus.

6. The driving apparatus according to claim 1, wherein the second driving circuit is configured to perform the fingerprint sensing operation during the skip period and other skip periods only when a frame polarity that the panel retains during the skip period or other skip periods conforms to a first frame polarity and not to perform the fingerprint sensing operation during the other skip periods when the frame polarity that the panel retains during the other skip periods conforms to a frame polarity different from the first frame polarity.

7. The driving apparatus according to claim 1, wherein the first driving mode comprises performing the touch sensing operation.

8. The driving apparatus according to claim 1, wherein during the skip period the fingerprint sensing operation comprises at least one of a reset operation and a readout operation.

9. The driving apparatus according to claim 1, wherein during the skip period comprising M consecutive frame periods, the first driving circuit suspends performing both of the display driving operation and the touch sensing operation and the second driving circuit performs the fingerprint sensing operation, where M is an integer.

10. The driving apparatus according to claim 1, wherein during at least one frame period of the skip period comprising M consecutive frame periods, the first driving circuit suspends performing the display driving operation and keeps performing the touch sensing operation, wherein the touch sensing operation and the fingerprint sensing operation are time-divisionally operated, where M is an integer.

11. The driving apparatus according to claim 1, wherein during at least one frame period of the skip period comprising M consecutive frame periods, the first driving circuit suspends performing the touch sensing operation and keeps performing the display operation, wherein the touch sensing operation and the fingerprint sensing operation are time-divisionally operated, where M is an integer.

12. The driving apparatus according to claim 1, wherein the first driving circuit is configured to determine whether a frame polarity of a current displayed frame conforms to the preconfigured frame polarity in response to receiving a fingerprint sensing operation request from a core control processor during a current frame period, wherein the second driving circuit is configured to start performing the fingerprint sensing operation right after the current displayed frame is completely displayed, when the frame polarity of the current displayed frame is determined to conform to the preconfigured frame polarity; and the first driving circuit is configured to performing at least the display driving operation for one frame period immediately after the current frame period, when the frame polarity of the current displayed frame is determined to NOT conform to the preconfigured frame polarity.

13. The driving apparatus according to claim 1, wherein the first driving circuit is configured to performing at least the display driving operation to display one more frame having a preconfigured frame polarity right before the fingerprint sensing operation starts, regardless of the frame polarity of a current displayed frame.

14. The driving apparatus according to claim 1, wherein the first timing control signal has a first logic level indicating the fingerprint sensing operation is enabled and a second logic level indicating the fingerprint sensing operation is disabled.

15. The driving apparatus according to claim 1, wherein the first timing control signal further carries information of a frame polarity.

16. The driving apparatus according to claim 1, wherein the first driving circuit is further configured to output the first timing control signal.

17. The driving apparatus according to claim 1, wherein the first driving circuit is further configured to output a second timing control signal indicating time intervals for performing the touch sensing operation and the second driving circuit is configured to perform the fingerprint sensing operation according to the first timing control signal and the second timing control signal.

18. An operation method of a driving apparatus, comprising:
performing, by a first driving circuit, a first driving mode on a panel comprising a display pixel array, a touch sensor array and a fingerprint sensor array during a plurality of frame periods;
performing, by the first driving circuit, a second driving mode after the plurality of frame periods;
outputting, by the first driving circuit, a first timing control signal associated with a fingerprint sensing operation in the second driving mode, wherein in the first driving mode, no fingerprint sensing operation is performed, but a display driving operation and a touch sensing operation are performed or merely the touch sensing operation is performed, and the first driving circuit suspends performing at least one of the display driving operation and the touch sensing operation during a skip period under the second driving mode, wherein the first driving circuit performs at least one of the display driving operation and the touch sensing operation outside the skip period under the second driving mode; and performing, by a second driving circuit, the fingerprint sensing operation during the skip period according to the first timing control signal.

19. The operation method according to claim 18, further comprising:

performing, by the first driving circuit, the second driving mode in response to receiving a command from a core control processor, wherein the command indicates it is ready to sense a fingerprint and the first driving circuit reports a detected touch position to the core control processor before receiving the command.

20. The operation method according to claim 18, further comprising:

periodically performing, by the first driving circuit, an operating cycle in the second driving mode, wherein the operating cycle comprises N consecutive frame periods during which the first driving circuit performs at least touch sensing operation and M consecutive frame periods during which the first driving circuit suspends performing at least one of the display driving operation and the touch sensing operation, wherein N and M are integer and the skip period comprises the M consecutive frame periods.

21. The operation method according to claim 20, further comprising:

performing, by the first driving circuit, the display driving operation to realize a first display frame rate under the first driving mode; and performing, by the first driving circuit, the display driving operation to realize a second display frame rate lower than the first display frame rate during the N consecutive frame periods.

22. The operation method according to claim 18, further comprising:

suspend performing, by the first driving circuit, at least one of the display driving operation and the touch sensing operation during a porch interval of each of frame periods in the second driving mode, wherein the porch interval is the skip period and the length of the porch interval is configured by a core control processor of an electronic apparatus which comprises the panel and the driving apparatus.

23. The operation method according to claim 18, further comprising:

performing, by the second driving circuit, the fingerprint sensing operation during the skip period and other skip periods only when a frame polarity that the panel retains during the skip period or other skip periods conforms to a first frame polarity and not to perform the fingerprint sensing operation during the other skip periods when the frame polarity that the panel retains during the other skip periods conforms to a frame polarity different from the first frame polarity.

24. The operation method according to claim 18, wherein the first driving mode comprises performing the touch sensing operation.

25. The operation method according to claim 18, wherein during the skip period the fingerprint sensing operation comprises at least one of a reset operation and a readout operation.

26. The operation method according to claim 18, wherein during the skip period comprising M consecutive frame periods, the first driving circuit suspends performing both of the display driving operation and the touch sensing operation and the second driving circuit performs the fingerprint sensing operation, where M is an integer.

27. The operation method according to claim 18, wherein during at least one frame period of the skip period comprising M consecutive frame periods, the first driving circuit suspends performing the display driving operation and keeps performing the touch sensing operation, wherein the touch sensing operation and the fingerprint sensing operation are time-divisionally operated, where M is an integer.

28. The operation method according to claim 18, wherein during at least one frame period of the skip period comprising M consecutive frame periods, the first driving circuit suspends performing the touch sensing operation and keeps performing the display operation, wherein the touch sensing operation and the fingerprint sensing operation are time-divisionally operated, where M is an integer.

29. The operation method according to claim 18, wherein the first driving circuit is configured to determine whether a frame polarity of a current displayed frame conforms to the preconfigured frame polarity in response to receiving a fingerprint sensing operation request from a core control processor during a current frame period, wherein the second driving circuit is configured to start performing the fingerprint sensing operation right after the current displayed frame is completely displayed, when the frame polarity of the current displayed frame is determined to conform to the preconfigured frame polarity; and the first driving circuit is configured to performing at least the display driving operation for one frame period immediately after the current frame period, when the frame polarity of the current displayed frame is determined to NOT conform to the preconfigured frame polarity.

30. The operation method according to claim 18, wherein the first driving circuit is configured to performing at least the display driving operation to display one more frame having a preconfigured frame polarity right before the fingerprint sensing operation starts, regardless of the frame polarity of a current displayed frame.

31. The operation method according to claim 18, wherein the first timing control signal has a first logic level indicating the fingerprint sensing operation is enabled and a second logic level indicating the fingerprint sensing operation is disabled.

32. The operation method according to claim 18, wherein the first timing control signal further carries information of a frame polarity.

33. The operation method according to claim 18, wherein the first driving circuit is further configured to output the first timing control signal.

34. The operation method according to claim 18, wherein the first driving circuit is further configured to output a second timing control signal indicating time intervals for performing the touch sensing operation and the second driving circuit is configured to perform the fingerprint sensing operation according to the first timing control signal and the second timing control signal.

* * * * *